United States Patent
Quinlan

(10) Patent No.: US 6,338,089 B1
(45) Date of Patent: Jan. 8, 2002

(54) METHOD AND SYSTEM FOR PROVIDING SESSION POOLS FOR HIGH PERFORMANCE WEB BROWSER AND SERVER COMMUNICATIONS

(75) Inventor: Cian M. Quinlan, Phoenix, AZ (US)

(73) Assignee: Bull HN Information Systems Inc., Billerica, MA (US)

(*) Notice: Subject to any disclaimer, the term of this patent is extended or adjusted under 35 U.S.C. 154(b) by 0 days.

(21) Appl. No.: 09/282,864

(22) Filed: Mar. 31, 1999

Related U.S. Application Data

(63) Continuation-in-part of application No. 09/166,877, filed on Oct. 6, 1998.

(51) Int. Cl.$^7$ .............................................. G06F 15/16
(52) U.S. Cl. ..................... 709/227; 709/203; 709/219; 709/228; 709/250
(58) Field of Search .................................. 709/200, 203, 709/217–219, 223–224, 227–229, 238, 242, 250; 707/10, 100; 713/200–202; 370/701

(56) References Cited

U.S. PATENT DOCUMENTS

| | | | |
|---|---|---|---|
| 5,355,406 A | | 10/1994 | Chencinski et al. |
| 5,459,871 A | | 10/1995 | Van Den Berg |
| 5,652,789 A | | 7/1997 | Miner et al. |
| 5,754,830 A | * | 5/1998 | Butts et al. .................. 709/227 |
| 5,867,661 A | * | 2/1999 | Bittinger et al. ............ 709/227 |
| 5,958,013 A | * | 7/2000 | King et al. .................. 709/227 |
| 6,098,093 A | * | 8/2000 | Bayeh et al. ................ 709/203 |
| 6,101,482 A | * | 8/2000 | DiAngelo et al. .......... 709/227 |
| 6,161,123 A | * | 12/2000 | Renouard .................... 709/203 |
| 6,212,565 B1 | * | 4/2001 | Gupta ......................... 709/229 |
| 6,216,264 B1 | * | 4/2001 | Zaremba, Jr. ............... 709/227 |

* cited by examiner

Primary Examiner—Zarni Maung
Assistant Examiner—Bharat Barot
(74) Attorney, Agent, or Firm—Faith F. Driscoll; John S. Solakian

(57) ABSTRACT

A client system utilizes a standard browser component and a transaction protocol gateway (TPG) component that operatively couples to the standard browser component. The browser component initiates the utilization of new session connections and reuse of existing session connections through the use of session pools as a function of the coding of the universal resource locators (URLs) contained in each issued request. The gateway component builds a plurality of session pool table structures at client system startup that define an initial number of pre-established persistent session connections for enabling communication with a number of server systems. Each browser URL is passed to the TPG component that examines a context field within the URL. If the context field has been set to a predetermined value, the TPG component in lieu of opening a new session connection to the designated server system, obtains a pre-established session connection from a session pool. Then the TPG component moves an entry corresponding to the session connection information to the PST component for enabling the browser component to communicate with a particular server system over the pre-established persistent session connection.

34 Claims, 12 Drawing Sheets

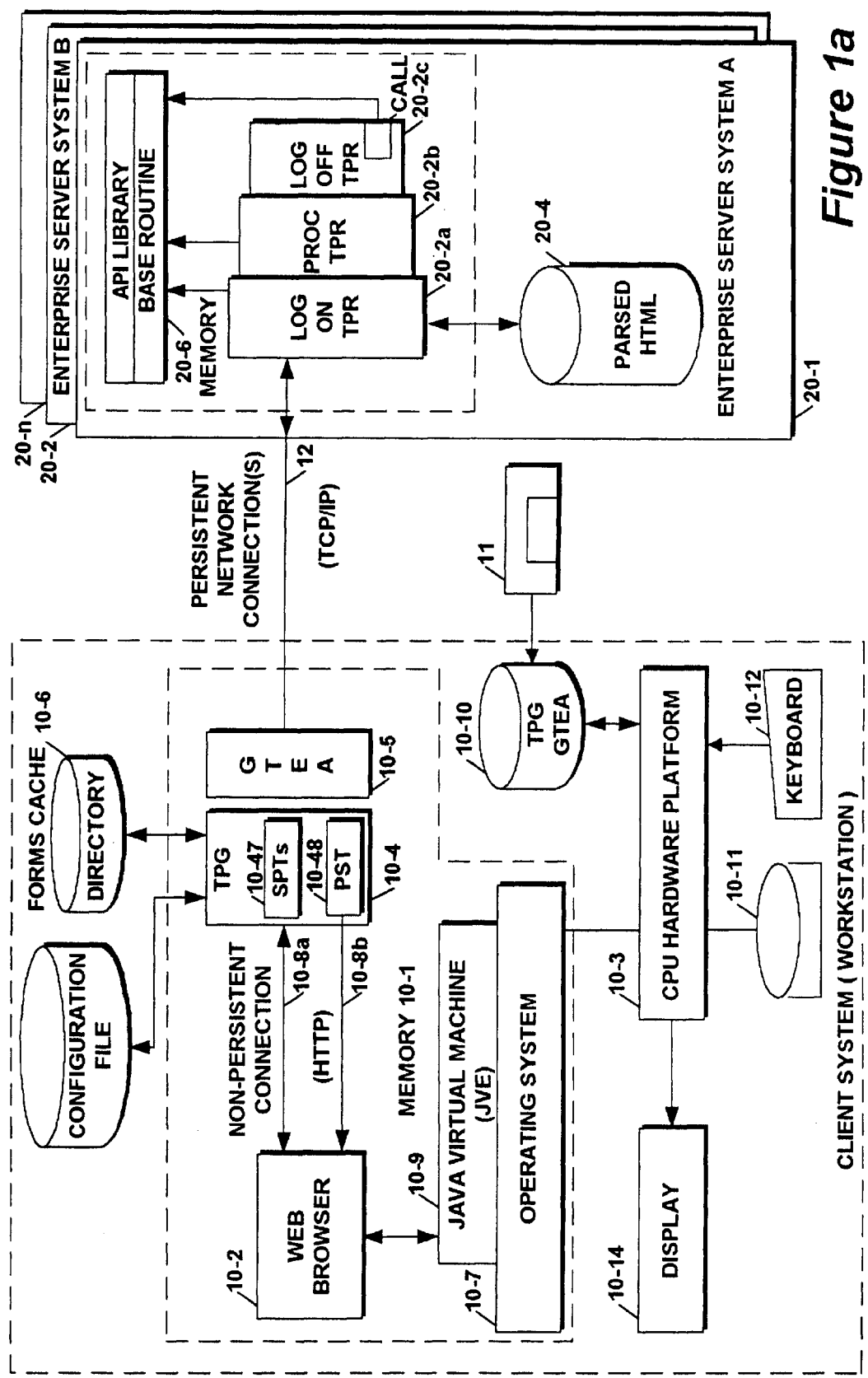

METHOD AND SYSTEM FOR PROVIDING SESSION POOLS FOR HIGH PERFORMANCE WEB BROWSER AND SERVER COMMUNICATIONS

This application is a continuation-in-part of the patent application entitled "Method and System for Providing High Performance Web Browser and Server Communications" bearing Ser. No. 09/166,877 filed on Oct. 6, 1998 still pending which is assigned to the same assignee as named herein.

BACKGROUND OF THE INVENTION

1. Field of Use

The present invention relates to Internet applications and more specifically, to methods and systems for providing efficient communications between Web browser and server systems.

2. Description of Related Art

Significant changes are being made by companies in how they communicate with their customers and the types of services offered due to Web technology. One such change has been the use of a Web browser as a common front end to a mainframe or an enterprise system. In the case of IBM hosts, two basic methods have been utilized to give browsers access to such systems. These methods have been generically called native 3270 and Hypertext Markup Language (HTML) conversion. In the native 3270 method, a special browser is utilized that contains some form of built-in 3270 terminal emulator software and applets that know what to do with the 3270 data streams once they reach the desktop system. In the conversion method, 3270 formatted screens are converted into HTML format and posted to a Web server. The converted screens can then be viewed using any browser. These approaches are discussed in greater detail in an article entitled "How To Put Mainframes on the Web" by Salvatore Salamone published in the June 1996 issue of Byte Magazine.

A disadvantage of the conversion approach is that it may not offer acceptable performance, throughput and response time in a high volume transaction environment. The reason is that the message is translated in a Web server extension and possibly in an intermediate application. Additionally, the message is forced to be routed through several applications and through intermediate applications. To overcome these disadvantages, one system employs an applet that supports mapping screen images associated with a transaction processing application to a modern, intuitive Graphical User Interface (GUI). This eliminates the need for intermediate message translation by having the browser application applet generate and process messages that are understood by the mainframe application. The applet also translates replies received from the application screen image format into a format that can be presented to and understood by the user. This approach is described in the copending patent application entitled "Method for Reducing Message Translation and Traffic Through Intermediate Applications and Systems in an Internet Application", Ser. No. 08/868,178, filed on Jun. 3, 1997 now U.S. Pat. No. 6,067,579 and assigned to the same assignee as named herein.

While the above approach improves performance by eliminating the need for intermediate message translation, it is specifically designed to operate with IBM mainframe hosts. Further, since the approach utilizes applets, it requires that the applet and HTML page be downloaded from a server over a non-persistent connection. The applet when executed within the browser is required to open a persistent connection back to the server. Hence, this approach necessitates the establishment of both persistent and non-persistent connections. Further, this approach still is quite time consuming and only performant when the ratio of persistent (applet to server) to non-persistent (HTML page and applet loading) traffic is high. However, even in those cases, the approach still requires that time be expended in establishing additional connections.

As well known in the art, in the classical client/server model, connections between client and application servers remain open until the client logs off the system. By contrast, in the Web environment, there is no mechanism provided for keeping the client-to-server connection open. Each time a new page is requested, the user, Web server and additional processing must reidentified or reinitialized. The reason is that the Web browser is "stateless". This "statelessness" makes it difficult to create Web-based applications requiring multiform client-to-server interactions.

In Web-enabled client/server tools, state and session is usually stored in client-side "cookie" files or hidden fields in HyperText Markup Language (HTML) forms. In Java application server environments, state and session management information is typically stored and managed on the server. Some server products make use of a "context" pool. When transactions are begun, the Web server generates a unique process identifier that is maintained with state information on the server in a "context" pool. Additionally, the process ID (or context ID) is embedded in the HTML passed along to the client, along with other state information. While state information may change during the course of a session, the process ID remains constant until the session terminates and the ID is discarded or returned to the context pool for reuse. These approaches can be viewed as server based approaches.

Another server based approach provides for retaining mainframe connection information on a web server that locates a user's session when the browser reconnects and delivers the input to the mainframe application being run on the associated mainframe or legacy system. An example of this approach is the GWEB product developed by Gallagher & Robertson described at their website at gar.no/gweb/.

The combination of process IDs and storage of state information in a context pool is described in such server based approaches as allowing the execution environment of Java application servers to track the states of numerous clients connected to the Web server. In addition, it allows users to return to Web pages and view them in the state in which they left them. Further, it also ensures that a session is active during the user's entire interaction with the application and keeps track of the state of the client's interaction, as well as any transactions that are in progress, making it possible to commit and roll back operations. For a further discussion of Java application servers, reference may be made to the article entitled "Selecting Java App Servers" by Dan Kara published in the June 1998 issue of Object Magazine.

The above approaches place the burden on the server system to generate and manage the use of such state information. More importantly, since the use of such state information does not control the establishment of connections, it does not necessarily reduce the traffic on the particular internetwork over which client and server systems communicate.

To reduce traffic, another prior art system makes an on-line transaction processing system accessible to Web browsers by establishing a predetermined plurality of transaction gateway clients to receive HTTP requests that are received by a Web server from the Web browsers. Concurrent processing of multiple transaction requests from the Web browsers is performed by the plurality of transaction gateway clients. Each transaction gateway client pre-establishes a static connection with the on-line transaction processing system. The pre-established connection allows requests from the Web browsers to be quickly routed to the transaction processing system. The gateway client translates between HTTP formatted requests from the Web browsers and the request format expected by the on-line transaction processing system. This system is described in further detail, in U.S. Pat. No. 5,754,772 that issued on May 19, 1998.

While the system provides access to a mainframe host, the system has to be able to pre-allocate the required number of static connections and gateway clients beforehand making it more difficult for the system to respond to dynamic changes in operations. Further, the system must expend time in translating requests into the format expected by the on-line transaction processing system.

Another relevant prior art approach utilizes a server and a web browser terminal emulator for providing a persistent connection to a legacy host system. A computer network environment allows connection of a client system to a legacy host system using such server system. The server system executes a client thread under a server. The client thread is operable to communicate with the legacy host system across a persistent TCP/IP socket connection. The computer network environment further includes a client system executing an applet process under a web server. The applet process is operable to communicate with the client thread across another persistent TCP/IP socket connection and is operable to provide a terminal session to a user of the client system. This approach is described in U.S. Pat. No. 5,754,830 issued on May 19, 1998. The main disadvantages of this approach pertain to requiring the loading of an applet and the inclusion of a web/emulation server.

In addition to the above, it has been found that substantial time is normally expended in dynamically opening and closing persistent connections for initiating and terminating active sessions. This can give rise to additional delays. One prior art call messaging system employs a session pool containing all the sessions executing in a given application. By grouping sessions into pools, multiple callers can simultaneously access an application while another group of callers can access a different application on another pool. The details of this system are disclosed in U.S. Pat. No. 5,355,406 that issued on Oct. 11, 1994.

Another prior art system includes as part of the system's operating system, a virtual machine (VM) that allocates and manages system resources for agents and assistants. According to the patent, to speed up the allocation of sessions, the VM keeps a session pool containing sessions that are not yet assigned to users and allocates sessions from the session pool in response to incoming calls. Each session in the pool is for a specific type of agent. This system is disclosed in U.S. Pat. No. 5,652,789.

A further prior art distributed data processing system that detects and resolves resource deadlocks utilizes session managers for maintaining session pools defined as data structures containing information about particular sessions. This system is disclosed in U.S. Pat. No. 5,459,871.

While the above systems utilize session pools, they are used for tracking different applications, specific type of agents or for resolving resource deadlocks. None of the systems are directed to handling client-server communications on an internetwork such as the "Internet" or "worldwide web". Further, none of the cited prior art patents that utilize session pools are concerned with delays in establishing persistent connections.

Accordingly, it is an object of the present invention to make reduce delays in establishing communications sessions between a Web browser and a server persistent without having to utilize static connections.

SUMMARY OF THE INVENTION

The above objects are achieved in a preferred embodiment of the present invention that utilizes "session pools" for processing requests generated by a user of a client system for accessing facilities of one or more server systems through a communications network. The client system includes a high performance gateway component that operates in conjunction with a standard browser component. In the preferred embodiment, the gateway component is installed on the same client system or on a client workstation system. The gateway component manages the establishment of persistent sessions in response to client requests and maintains information uniquely identifying existing persistent sessions opened between the client system and the server systems.

In accordance with the present invention, the client side capabilities are enhanced through the inclusion of such a gateway component that establishes and manages pre-established "session pools". The gateway component operatively couples to the standard browser component through a standard browser interface. More specifically, the browser component and gateway component communicate using standard "stateless" HTTP protocols over a standard browser interface. The gateway component operatively couples to each of the server systems through an internetwork (e.g. Internet). In the preferred embodiment, the gateway component communicates with each server system through several layers of protocols to obviate the need to develop additional protocol software for running existing server applications. The protocols used in the preferred embodiment are HTTP, DSA and TCP/IP.

According to the teachings of the present invention, a session connection can be taken from a pre-established session pool table structure instead of creating a new session connection and incurring the associated overhead. The decision to use a preexisting session connection from a session pool or to create a new session connection is based on an indicator value (i.e., context field) contained in the URL. If the context field of the URL contains a value of zero, the gateway component creates a new session connection as described in the referenced parent patent application. The gateway component opens a new session connection to the server system and records the session information as an entry in a persistent session table (PST) component maintained by the gateway component. If the context field equals the predetermined value (i.e., equal to 1), the gateway component takes a session connection entry from the session pool table structure, if one is available and transfers the entry to the PST component. Thereafter, the gateway component initiates normal reopen operations for the existing session connection.

All of the session connections in each session pool table structure have the same endpoint so that persistent session connections from a session pool can be used interchangeably. Multiple session pools are established for connecting the gateway component to multiple endpoints. For example, all the session connections for one enterprise server (e.g.

server A) will be contained in one session pool whereas all the session connections for another server (e.g. server B) will be contained in another session pool. In the preferred embodiment, the host address portion of the URL is used to select the appropriate session pool.

In greater detail, the gateway component through an initialization process establishes a set of sessions entries organized into a session pool table structure for each unique end-point (e.g. each host/enterprise server system to be accessed). Also, a master session pool table structure is established that contains session pool key index values for locating each of the pre-established session pool table structures. Such session pool table structures are located by the host address portion of the URL that serves as a key to select the appropriate session pool table index value from the master session pool table structure.

The numbers of initial and maximum persistent session connections are programmable. That is, the initial and maximum session connections are established through a configuration file or from a command line or provided through an administrative page. The initial number of session connections corresponds to the number of session connections that the gateway component creates per session pool. As indicated, multiple session pools are created in accordance with the number of endpoints. The maximum value corresponds to the maximum number of session connections that can be in a session pool. Session connections that are otherwise eligible to be returned to a session pool are discarded if the maximum value for that pool has been met or exceeded. During operation, each session pool connection entry as it is being created is marked as "shared". This allows the session connection to be returned to the session pool when the session connection is logically closed.

As described in the referenced parent patent application, the server system's response to an initial request from the gateway component following the establishment of the new persistent connection generates a HTML page with a BASE tag value and also communicates the base value to the gateway component that stores it as part of the PST entry. Relative links in the new HTML page, when activated, are built by the browser incorporating the new BASE value which results in a URL containing the new base value being used on any subsequent requests which uses these links. The BASE value in the URL enables the gateway component to locate the connection, which enables the use of an established persistent connection throughout a session.

The arrangement of the present invention improves system performance by providing "client side" controlled persistent session pool connections. This eliminates the need to continuously establish new persistent connection sessions each time the "stateless" browser component initiates a request. Further, the invention accomplishes this by extending the functionality of the client system by the addition of the gateway component thereby relieving the server system from the burden of having to establish and control persistent connections.

Thus, in accordance with the teachings of the present invention, the gateway component of the preferred embodiment by including the capability of enabling use of "session pools" can immediately establish new persistent session connections with a number of different host (server) systems in response to a browser component generating a URL specifying a new session connection. This results in improved performance.

As discussed, the gateway component through an initialization process establishes a plurality of persistent session connections. In the preferred embodiment, this is accomplished through the use of an administrative page that can be tailored by an administrator or user using the client browser component to facilitate configuration of session pools.

In accordance with the teachings of the present invention, the above persistent session pool capabilities are invoked by the browser component by the same basic URL mechanism. As discussed, the URL of the preferred embodiment includes a context field that can be coded to contain a predetermined value (i.e., =1) that enables a user to designate when session pooling is to take place. For example, a user may elect not to enable the session pooling because of not wanting to share a common persistent connection for reasons of maintaining security.

The gateway component of the present invention requires no changes to the standard browser system. The gateway component in the preferred embodiment is implemented as a plurality of class objects that can run on the virtual machine included as part of the standard browser and utilize standard Java library routines for establishing and maintaining persistent connections. Hence, the present invention is able to maximize the use of capabilities included with a standard browser.

Further, the present invention enhances performance obtained through the use of session pools by coding all of the pertinent connection information and the selection of session pools into the URL. This avoids unnecessary scanning operations for detecting "cookies" in HTTP headers and hidden form fields in HTML document pages. In addition, since the URL does not point to an actual file system directory, it is possible to have a unique URL for every persistent connection. Thus, the gateway component is able to maintain persistent connections through the use of session pools while at the same time conforming to the requirements of the HTTP stateless protocol.

It will be noted that the term "gateway" has been used in referring to the access mechanism of the present invention. In accordance with the teachings of the present invention, the term "session" refers to the persistent session logical connection established between the gateway component and a server system at a particular endpoint for transferring HTTP browser requests.

DESCRIPTION OF THE DRAWINGS

FIG. 1a is an overall block diagram of a transaction processing system that utilizes the session pooling method and client browser access component of the present invention.

DESCRIPTION OF THE PREFERRED EMBODIMENT

Figures 1, 3A:
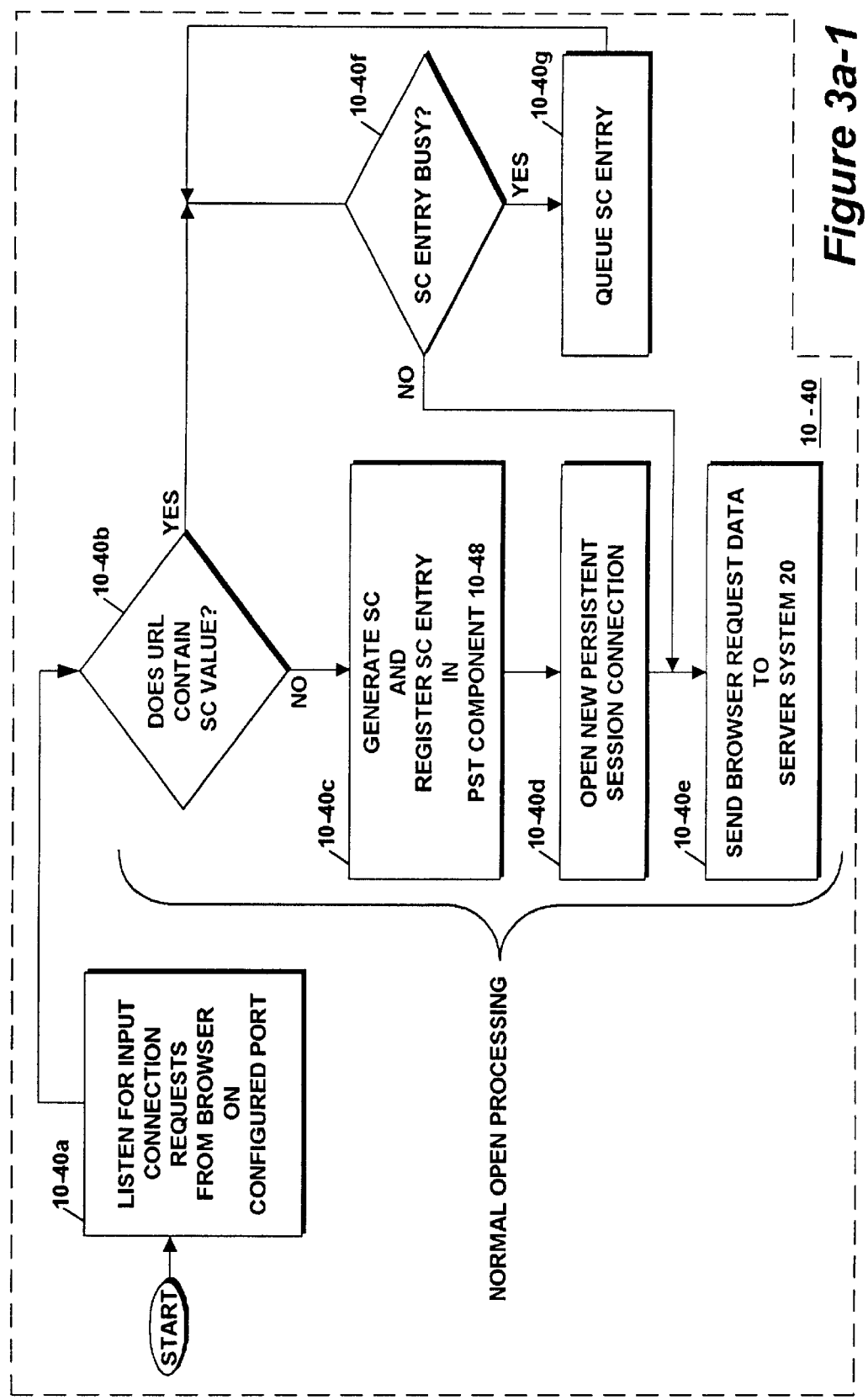
FIGS. 3a-1 through 3c illustrate in greater detail, the components of the client browser system of FIG. 2.
Figures 2, 3A:
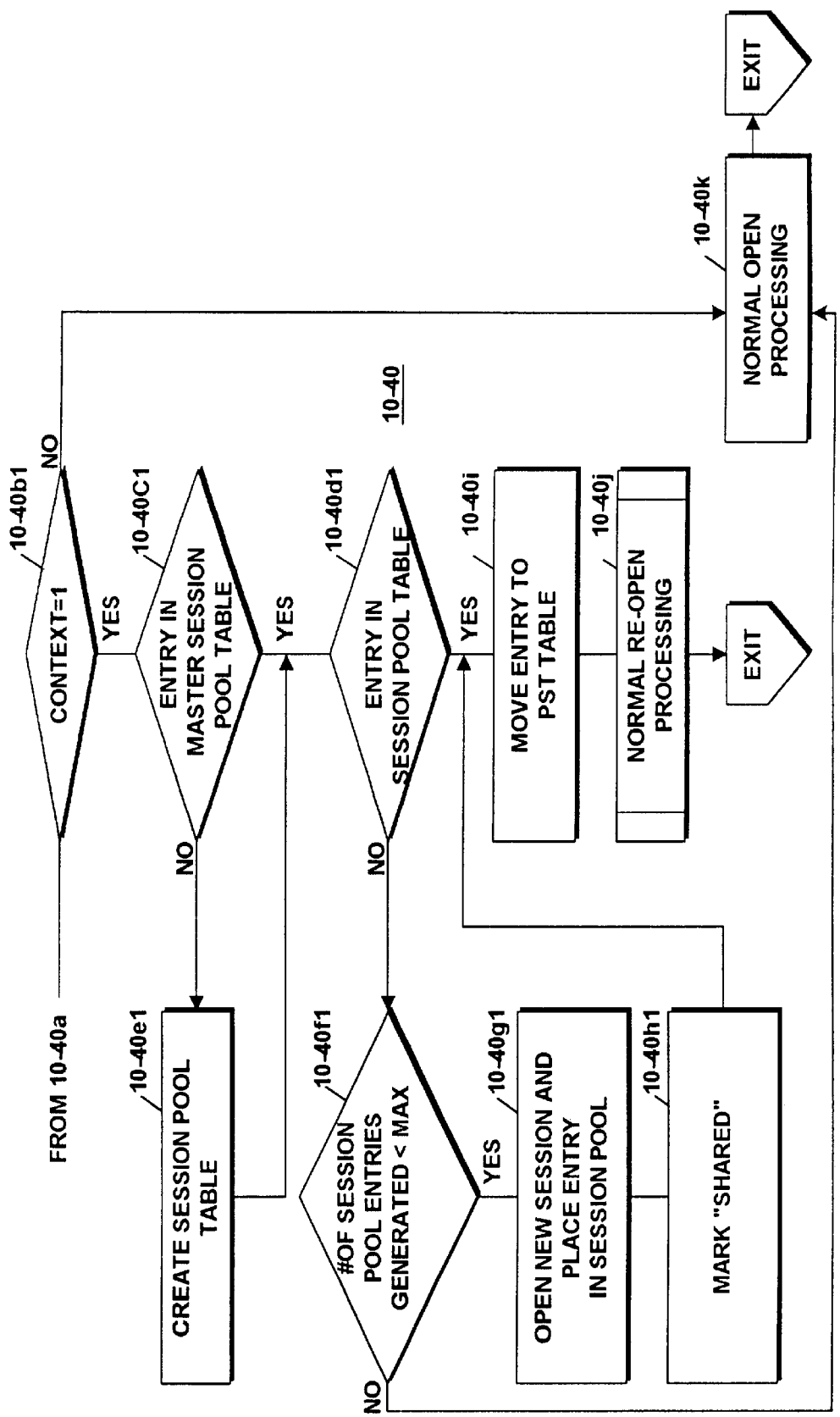

FIG. 1 illustrates a client server system 10 that includes the method and the transaction protocol gateway (TPG)

component of the present invention. As shown, the system 10 includes a plurality of enterprise server systems 20-1 through 20-n and a client system 10 that couple to each other through a communications network 14 utilizing the TCP/IP protocol. Server System Each enterprise server system 20 is capable of running transaction processing application software 20-2 and database storage 20-4. The server system 20 can be typically a mainframe transaction processing system, conventional in design, that supports a number of workstation users. For example, the server enterprise system 20 may take the form of the Bull GCOS8 system manufactured by Bull HN Information Systems Inc. that runs transaction processing software designated as TP8. The transaction processing application software stored in enterprise system's memory includes a plurality of transaction program routines (TPRs) designated as 20-2a through 20-2c. Such routines provide for accessing HTML documents stored on database storage 20-4 and for communicating with the client system 10 using the HTTP protocol. These routines operatively couple to an API library component 20-6. Component 20-6 stores a plurality of runtime routines that enables a TPR transaction program to respond to HTTP requests from browser client system 10. A particular API routine pertinent to the present invention is an HTML_BASE routine that is called by a TPR application program for generating a BASE value as described herein.

The database storage 20-4 acts as a repository for HTML form based documents. In the preferred version of such software, the HTML documents before being stored are passed through a parser that parses each document into static and dynamic portions. This enables transmission of static HTML records without requiring the server to interpret such records. This arrangement is described in greater detail in the copending application entitled, "Method and Apparatus For Improving Code Execution Performance By Using Parsed HTML," invented by Michael Giroux, filed on May 13, 1998, bearing Ser. No. 09/078,084 now abandoned and which is assigned to the same assignee as named herein.
Client System As illustrated in FIG. 1, client system 10 includes a web browser component 10-2, a transaction protocol gateway (TPG) component 10-4, a protocol conversion layer component 10-5 (GTEA) and a forms cache component 10-6. More specifically, with reference to FIG. 1, the client system 10 includes a central processing unit that corresponds to CPU hardware platform 10-3, a main memory 10-1, disk storage 10-10, a plurality of input devices such as a keyboard 10-12 and a pointing device or mouse 10-11 and an output device such as CRT display 10-14, each of which interfaces as indicated. The hardware platform 10-3 runs under the control of an operating system 10-7 such as Windows NT or a UNIX based operating system. The client system 10 also may utilize other software and hardware that includes standard internetwork web browser software. In the preferred embodiment, the web browser component 10-2 includes commercially available application browser software such as Netscape Navigator or Microsoft Explorer that may be Java enabled. That is, browser component 10-2 may include the capability of executing applets under control of a Java virtual machine (JVM) component 10-9. The TPG component 10-4 and GTEA component 10-5 execute Java code under JVM component 10-9. It will also be appreciated that client system 10 also includes appropriate interface network (not shown) that allow the system to send and receive data from any network to which system 10 may connect. For example, the network may be a local area network (LAN) or, more specifically, the Internet.

As indicated, the web browser component 10-2 operatively couples to the TPG component 10-4 and communicates with such component through a pair of "nonpersistent" connections 10-8a and 10-8b established by utilizing a standard HTTP protocol (e.g. HTTP 1.0, HTTP 1.1). The connections 10-8a and 10-8b are established through configurable ports as described herein. The TPG component 10-4 includes routines/methods for performing a listener function and a connection function. The listener function involves listening on one configurable port for browser "connections" communicated via HTTP protocol requests (e.g. GET) and listening for administrative commands on the other configurable port. The connection function involves establishing the required persistent session connections as discussed herein.

As shown in FIG. 1, the TPG component 10-4 includes a group of session pool table (SPT) structures 10-47 for managing session pools according to the teachings of the present invention. These structures are initialized at system startup by gateway component 10-4 using entry values obtained from a configuration file 10-15 or from a command line or generated using the administrative page provided through port 10-8b as discussed herein in greater detail.

As shown in FIG. 1, the TPG component 10-4 further includes a persistent session table (PST) structure component 10-48 that is used by the connection function for storing session connection information for establishing and maintaining persistent connections between client system 10 and server system 20 in addition to reusing existing session connections. The persistent session table (PST) structure component 10-48 operatively couples to the group of SPT structures 10-47 for accessing session connection information for establishing and maintaining persistent connections through session pools. Additionally, the PST component 10-48 is used by routines/methods that manage the sessions taking place such as performing standard "socket" session functions (e.g. open( ), read/write( ), close( )) using standard Java network library routines executing under JVM component 10-9. In the preferred embodiment, PST component 10-48 corresponds to a hash table structure whose entry locations are accessed via a token value. The use of such structures for identifying or tracking objects or entities by a token (e.g. name) as the identifying key is well known in the art. The use of PST component 10-48 is discussed in greater detail herein.

In greater detail, the GTEA component 10-5 is a "service" which converts DSA calls (i.e., native Bull HN Information Systems GCOS communications protocol) to TCP/IP calls using the so-called RPCIO06 protocol. This allows DSA to run over the TCP/IP protocol. In the preferred embodiment, the GTEA component 10-5 establishes a simple API that enables users to write client applications using open TCP/IP standards while at the same time utilizing the advantages of the DSA protocol. The advantages of using such a protocol component are discussed in a presentation entitled, "G&R Host Links BUS 1996", available at the Gallagher & Robertson web site located at gar.no/presentations/hl96us/. Examples of the GTEA component are provided in the Appendix portion of this specification. In a similar manner, GTEA component 10-5 also enables the SNA protocol layer to run over TCP/IP. As well known, SNA (systems network architecture) is a widely used communications protocol framework developed by IBM Corporation that enables different models of IBM computers to exchange and process data over a communications network. It will be appreciated that when the SOCK protocol is to be used, the GTEA component 10-5 is bypassed. The selection and use of different communications protocols in conjunction with TPG component 10-4 is described in greater detail herein.

Figure 2:
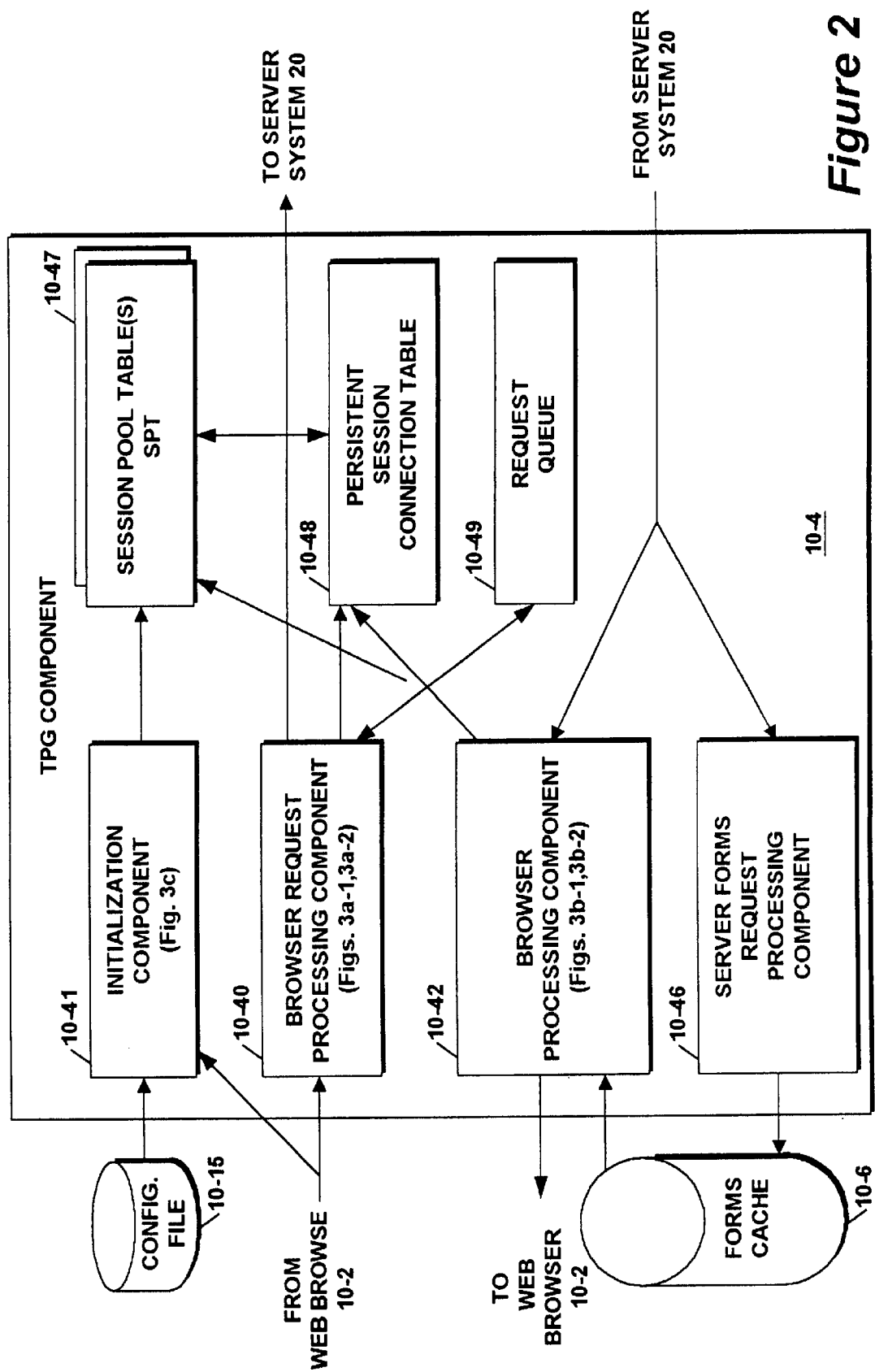
FIG. 2 illustrates in greater detail, the client browser system of the present invention.

While the preferred embodiment of the present invention is being described relative to a client workstation system, those skilled in the art will appreciate that the present invention is capable of being distributed as a program product in a variety of forms and that the present invention applies equally or operates independently of the type of media used to carry out the distribution. For example, as indicated in FIG. 1, the components of the present invention may be contained on magnetic recordable type media such as a floppy disk 11 of FIG. 1. In this case, the program product components (i.e., TPG component 10-4 and GTEA component 10-5) contained on the disk 11 would be installed on client system 10. More specifically, the contents of disk 11 would be read under the control of hardware platform 10-3 and then loaded onto mass storage 10-10 (e.g. hard disk). As indicated on FIG. 1, these program product components would also be loaded into memory 10-1 for operating in conjunction with the other software components of the client system 10. FIG. 2

FIG. 2 illustrates in greater detail, the different functional components of TPG component 10-4. As shown, the component 10-4 includes a browser request processing component 10-40 that operatively couples to the PST component 10-48 and to a connection request queue 10-49. Component 10-4 further includes an initialization component 10-41 that operatively couples to the SPT component 10-47 that in turn operatively couples to PST component 10-48. In addition, component 10-4 includes a response processing component 10-42 and server forms request processing component 10-46. In the preferred embodiment, the different components of TPG component 10-4 are implemented using Java classes that provide a set of cooperating objects. The architecture defined by such classes and objects is described in greater detail in the Appendix.

The request processing component 10-40 processes browser connection requests and establishes the required persistent session connections either by establishing new session connections or using existing session connections. Thus, component 10-40 performs the listener and connection functions discussed above. The logic of component 10-40 in processing input connection requests is illustrated in greater detail in FIG. 3*a*-1. According to the teachings of the present invention, component 10-40 further includes logic for processing browser connection requests with minimum delay using persistent session pools. This logic is illustrated in greater detail in FIG. 3*a*-2. The operations performed by component 10-40 will be discussed in greater detail relative to those figures.

The initialization component 10-41 performs the function of initializing the different tables of component 10-47 to entry values obtained from configuration file 10-15 or from command lines or generated using the administrative page provided via port 10-8*b*. The logic of component 10-41 in performing the initialization process at system startup is illustrated in greater detail in FIG. 3*c*. The operations performed by component 10-41 will be discussed in greater detail relative to that figure.

The response processing component 10-42 responds to responses received from a server system during sessions initiated by browser component 10-2. Accordingly, it communicates with request processing component 10-40 as required for updating the status of existing persistent connections (e.g. close( )). Additionally, since component 10-42 provides responses to the browser component 10-2, the component also is involved in processing remote forms along with component 10-46. The logic of component 10-42 in processing server requests is illustrated in greater detail in FIG. 3*b*-1. According to the teachings of the present invention, component 10-42 further includes logic for responses received from a server system with minimum delay using persistent session pools. This logic is illustrated in greater detail in FIG. 3*b*-2. The operations performed by component 10-42 will be discussed relative to those figures.

The server forms request processing component 10-46 responds to remote forms requests received from server system 20 via an appropriate remote forms protocol. The component 10-46 passes the results of such form processing to component 10-42 for forwarding to browser component 10-2. The logic of component 10-46 in processing remote form requests is described in greater detail in the referenced parent patent application.

DETAILED DESCRIPTION OF TPG COMPONENTS

FIGS. 3*a*-1 and 3*a*-2—Gateway Request Processing Logic

FIG. 3*a*-1 illustrates the logic of component 10-40 as described in the referenced parent patent application. Briefly, component 10-40 using its listening function, listens for input connection requests from browser component 10-2 on the configured port (i.e., block 10-40*a*). For each browser request accepted, component 10-40 examines the request's URL to determine if it contains a session context (SC) value (i.e., block 10-40*b*). Next, as indicated in block 10-40*c*, the component 10-40 determines if the SC value equals zero. If the SC value equals zero, this indicates that a session has not been established between the browser component 10-2 and the server system 20 (i.e., "no" path). As indicated in block 10-40*c*, component 10-40 invokes its connection function to establish a persistent session connection via "sockets". More specifically, component 10-40 first generates a session context (SC) value and "registers" it in one of the locations of PST component 10-48 (i.e., block 10-40*c*). That is, as indicated in block 10-40*d*, the component 10-40 records session information in the assigned PST location and opens a new session connection via a call to protocol conversion layer component 10-5 which uses "sockets" (i.e., issues a socket "open" call).

The establishing of the session connection involves calling standard socket subroutines and network library subroutines provided by the client system operating system. Once a "session connection" has been established between the server system 20 and client system 10, component 10-40 sends the browser data to server system 20 over the newly established persistent connection (i.e., block 10-40*e*).

As indicated, if the session context value contained in the URL is not equal to zero, indicating that a persistent session connection has already been established, component 10-40 checks to see if the session connection is busy (i.e., block 10-40*f*). It will be noted that TPG component 10-4 allows (serializes) multiple requests from the same browser component over the same session connection. If the session connection specified by the browser request is busy, then component 10-40 queues the entry until the session connection is available (i.e., blocks 10-40*f* and 10-40*g*). As indicated, blocks 10-40*c* and 40*d* include the operations that are carried out during normal open processing.

FIG. 3*a*-2 illustrates the logic of component 10-40 that further includes the capability of using session pools according to the teachings of the present invention in responding to browser requests. In the manner described above relative to FIG. 3*a*-1, component 10-40 listens for input connection requests on configured port 10-8*a*. For each accepted request, component 10-40 examines the request's URL to determine if it contains a session context value of "1" (i.e. block 10-40*b*1). This function is equivalent to that of block 10-40*b* of FIG. 3*a*-1. If the URL context field value equals zero signaling the opening of a new session connection, then component 10-40 then carries out the normal open processing operations of FIG. 3*a*-1.

Figure 5A:
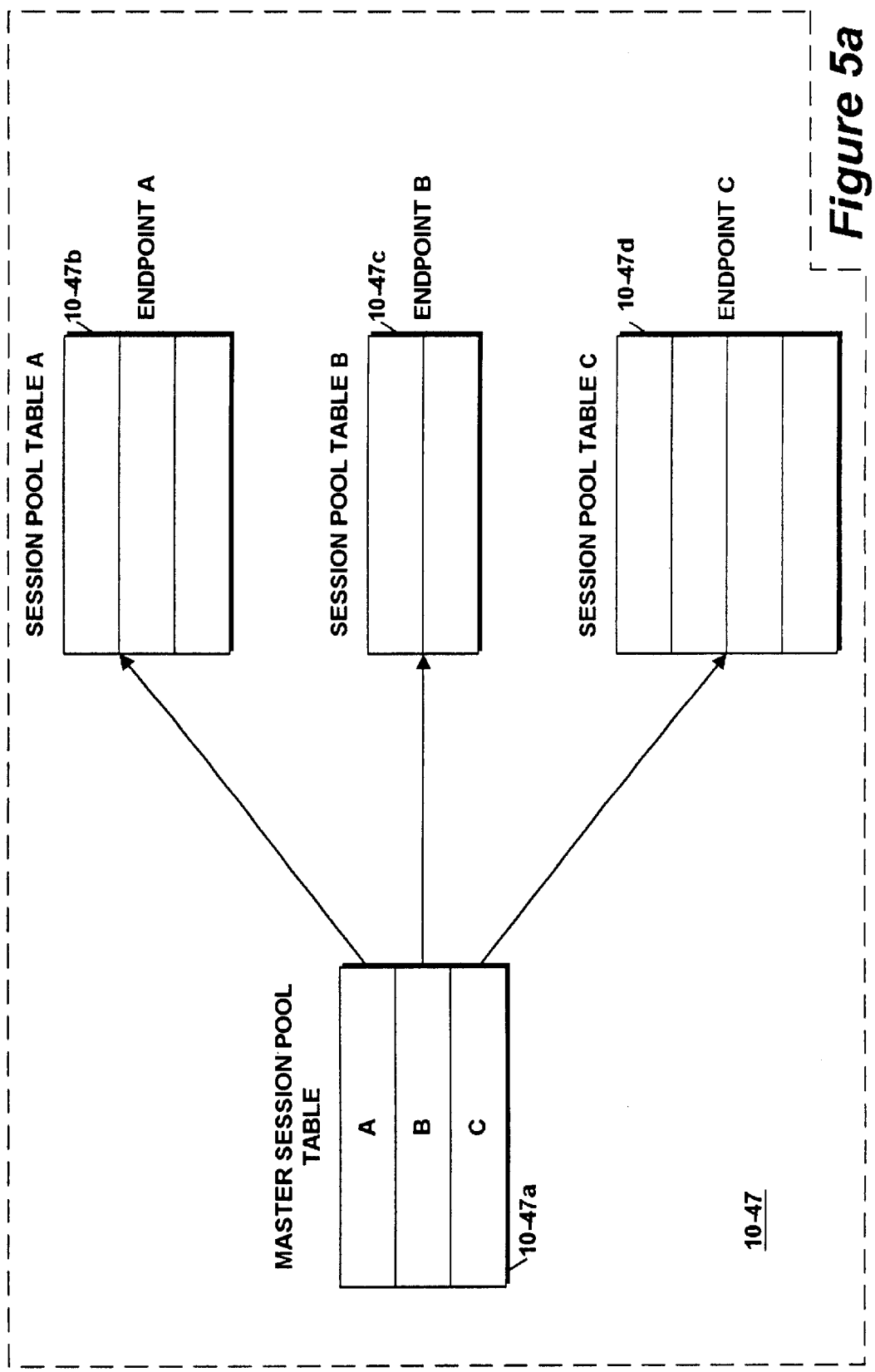
FIGS. 5a and 5b are diagrams illustrating the organization and management of session pools according to the teachings of the present invention.

If the URL context field value equals "1" signaling that a new session is required but that the session connection can be taken from a session pool, then component 10-40 performs the operations of blocks 10-40*c*1 through 10-40*i* using the SPT table structures 10-47 of FIG. 5*a* for establishing a new persistent session connection. In greater detail with reference to FIG. 5*a*, component 10-40 accesses a master session pool table 10-47*a* to locate the various session pool table structures (i.e., 10-47*a* through 10-47*d*) for a determining if an endpoint exists and if a session connection is available in that pool. If a session pool exists and a session connection is available, then component 10-40 moves the entry corresponding to that session connection to PST table 10-48. Thereafter, normal open processing is re-opened as explained herein. If no session connection pool exists for that endpoint, then component 10-40 creates a new session pool table as explained herein, places the session entry in the new pool and marks the entry as "shared". Thereafter, component moves the entry to the PST table 10-48 and processing continues as described above relative to FIG. 3*a*-2.

Additionally, as indicated in FIG. 3*a*-2, if there is no available entry in the session pool table, component 10-40 performs the operations of blocks 10-40*f*1 through 10-40*j*. In greater detail, component 10-40 determines if the number of session pool entries generated is less than the established maximum value. When the maximum value is not exceeded, then component 10-40 opens a session in the manner previously described and places an entry into the session pool table. The entry is marked "shared" and component 10-40 moves the entry to PST table 10-48 and performs normal re-open processing.

Figures 1, 3B:
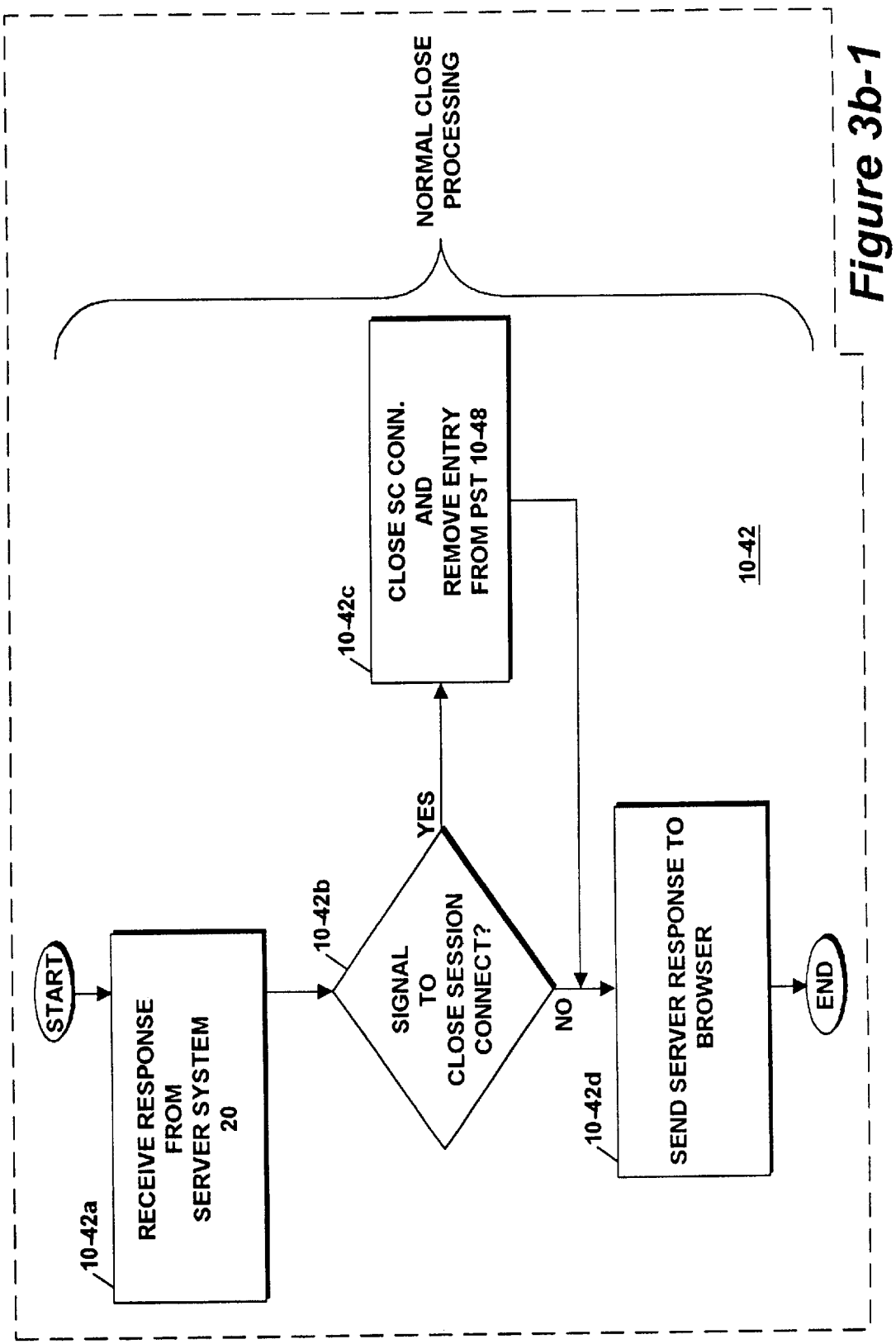
Figures 2, 3B:
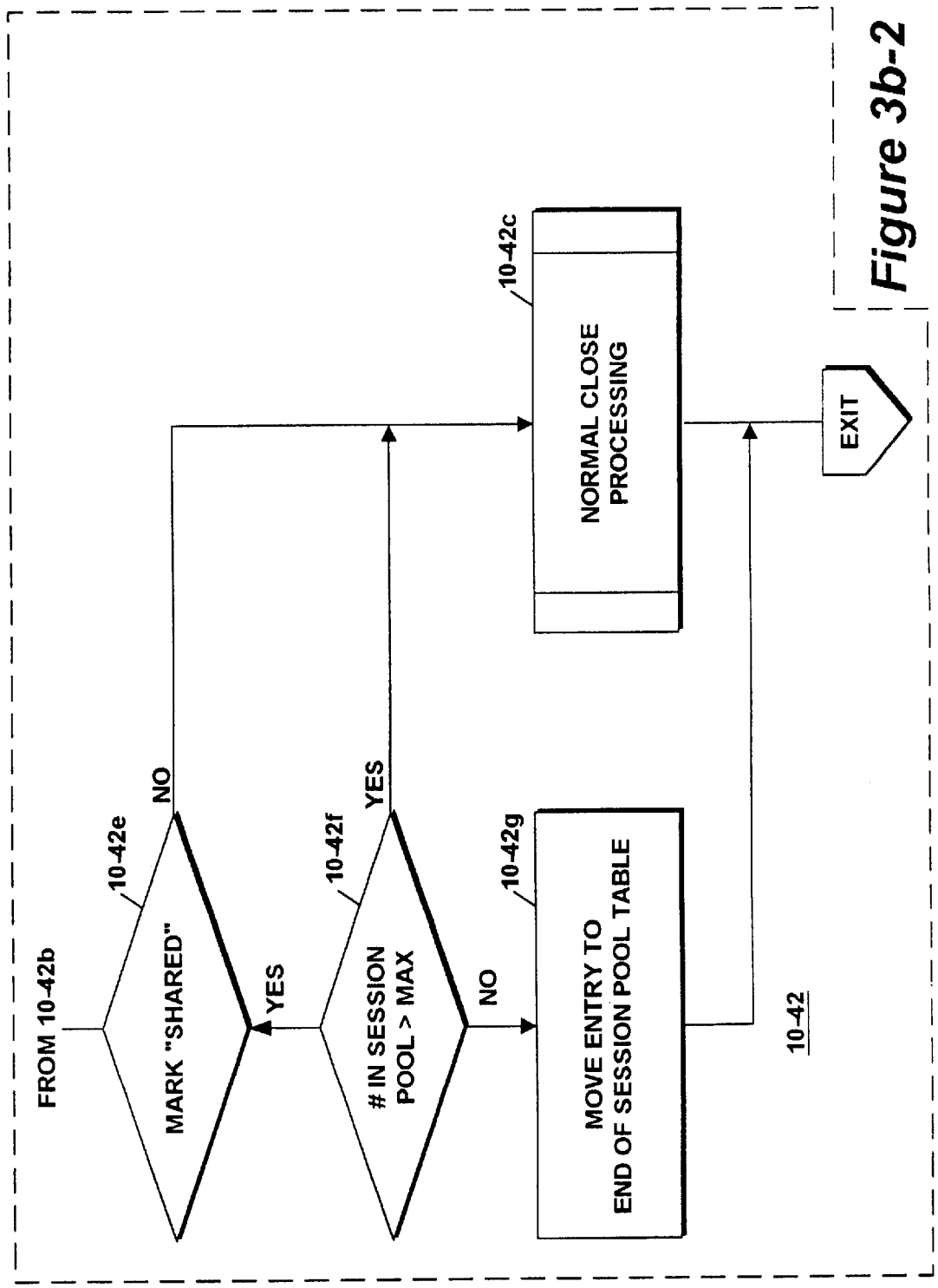

FIGS. 3*b*-1 and 3*b*-2—Gateway Response Processing Logic

FIG. 3*b*-1 illustrates the logic of component 10-42 utilized in the referenced parent patent application. As indicated in block 10-42*a*, component 10-42 receives responses (messages) from server system 20. If the component 10-42 receives a signal to close the persistent connection from the server system 20 (i.e., block 10-42*b*), then component 10-42 operates to close the "socket" connection and delete the SC connection entry from PST component 10-48 identified by the SC value. After carrying out those operations, component 10-2 forwards the server response to the browser component 10-2 (i.e., block 10-42*d*).

FIG. 3*b*-2 illustrates the logic of component 10-42 that further includes the capability of using session pools according to the teachings of the present invention in responding to server responses. In the manner described relative to FIG. 3*b*-1, component receives responses from each server system. If a signal to close the persistent connection is received, then component 10-42 determines if the session connection being closed is marked "shared"; that is, it came from a session pool. If it is marked "shared" (i.e., block 10-42*e*) and the maximum number of session connections in the pool has not been exceeded (i.e., block 10-24*f*), then component 10-42 removes the entry from the PST table 10-48 and reinserts the entry into the appropriate session pool linked list (i.e., block 10-42*g*).

Figures 3, 3B:
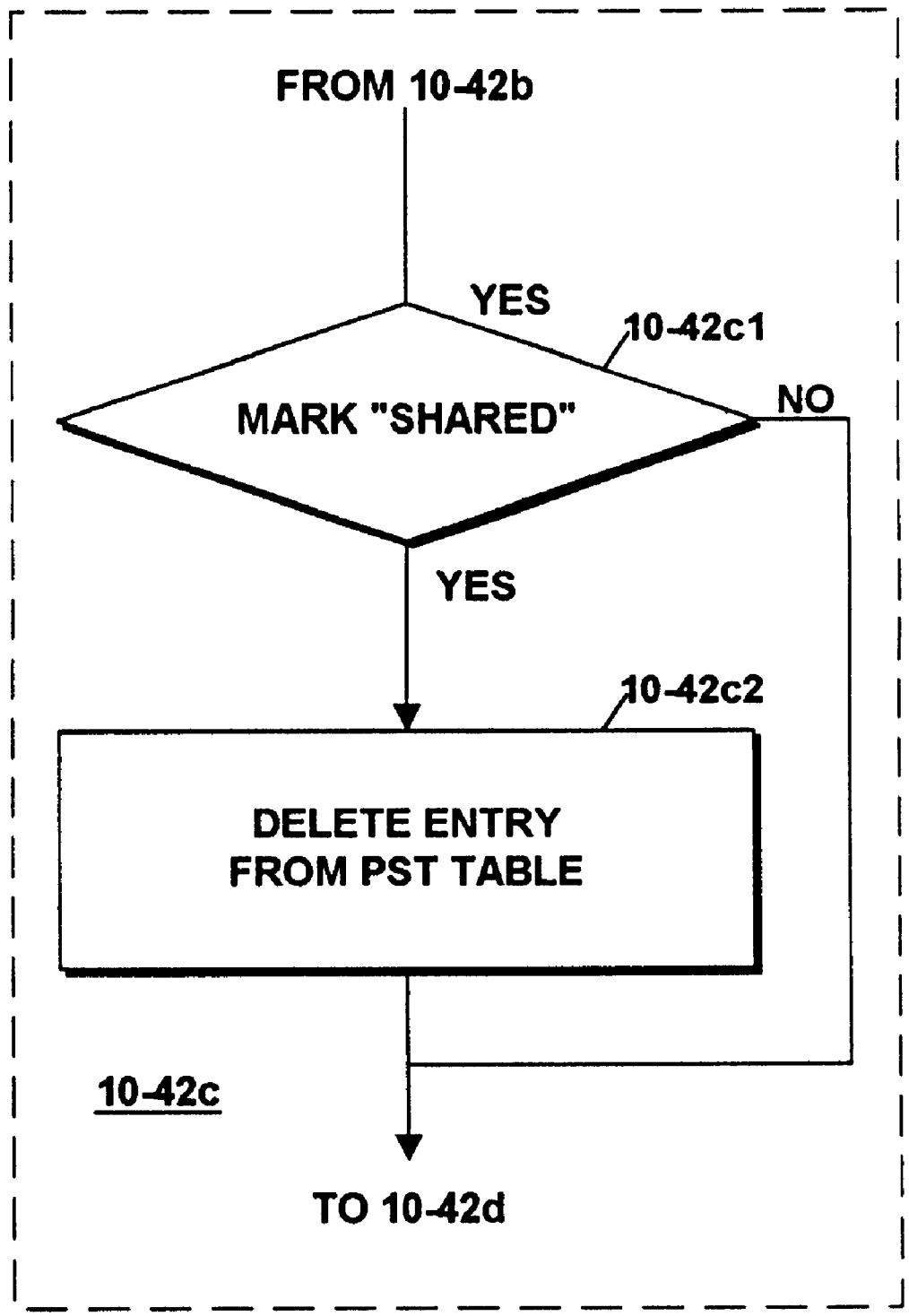

As will be described relative to FIG. 5*a*, the endpoint address field in the entry is used as a key to the master session pool table 10-47*a* for locating the appropriate session pool table structure. When these conditions are not met, then the normal close processing logic of FIG. 3*b*-1 executes the operations of FIG. 3*b*-1. It will be noted that the normal close logic is modified according to FIG. 3*b*-3. That is, block 10-42*c* has been expanded to include the capability of determining if the session connection being closed is marked "shared". As indicated, if it is so marked, then component 10-42 removes the entry from PST table 10-48 (i.e., block 10-42*c*1) for return to session connection pool. If it is not marked "shared", then the entry is retained in PST table 10-48 (i.e., block 10-42*c*2).

Figure 3C:
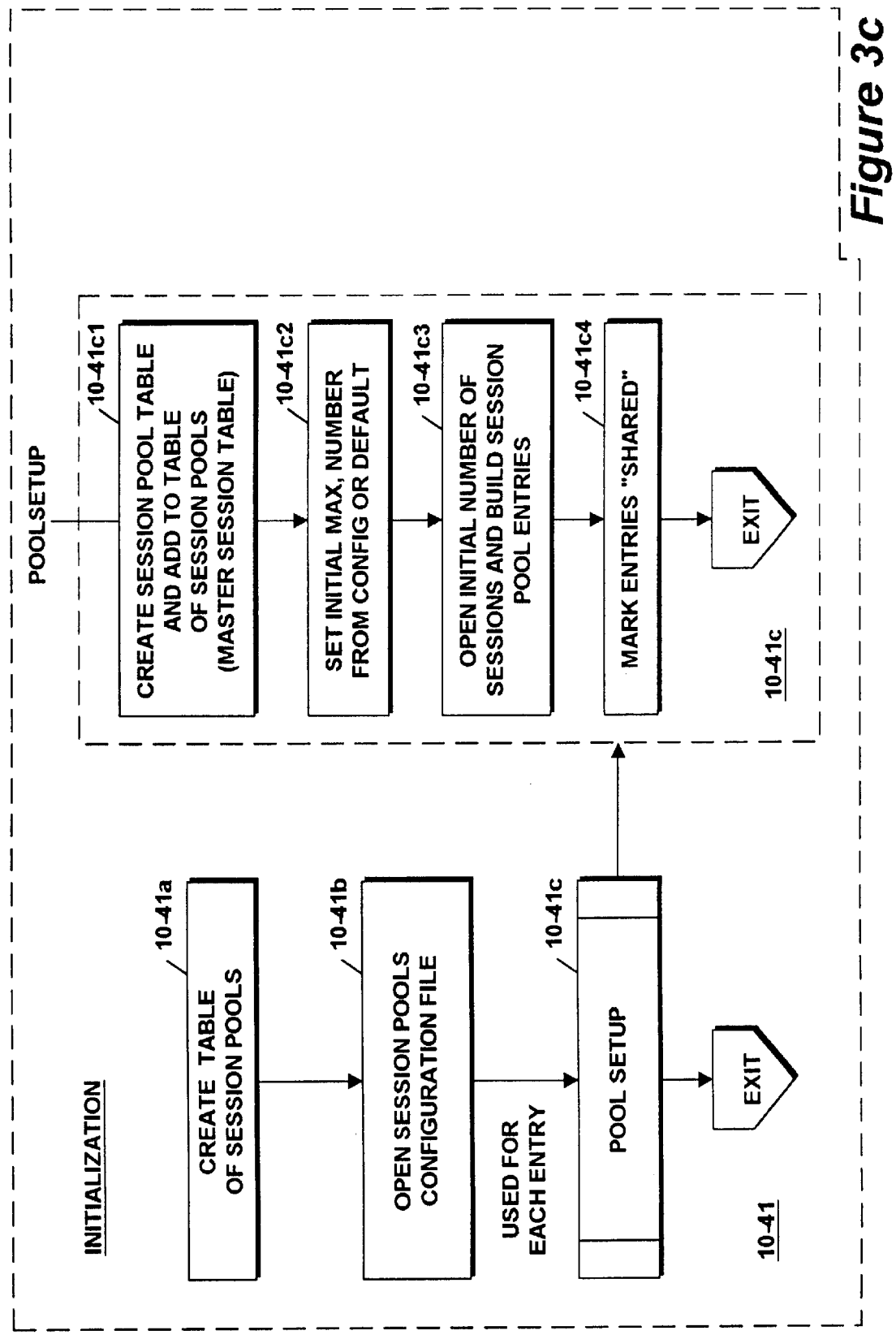

FIG. 3*c*—Initialization Component 10-41

FIG. 3*c* illustrates the logic of component 10-41 for executing a series of operations at startup to initialize the required number of session connection pools. As indicated, component 10-41 creates (i.e., allocates a group of memory locations) for establishing a master session pool table (i.e., block 10-41*a*) for locating the various session connection pool tables. Next, component 10-41 opens session pools configuration file 10-15 containing a list of endpoint entries for which session connections are to be pre-established (i.e., block 10-41*b*). For each entry in configuration file 10-15, component 10-15 makes a call to a Pool setup routine 10-41*c*.

The Pool setup routine 10-41*c* initializes each session connection pool table for each endpoint in the configuration file list. More specifically, as indicated in block 10-41*c*1, component 10-41 creates a session pool table that is added to the master session pool table of session pools. That is, component 10-41 creates an entry defining the location of the created session pool table that is placed into the master session pool table. The same routine is also used for creating a session pool table by component 10-40 of FIG. 3*a*-2.

Figure 1B:
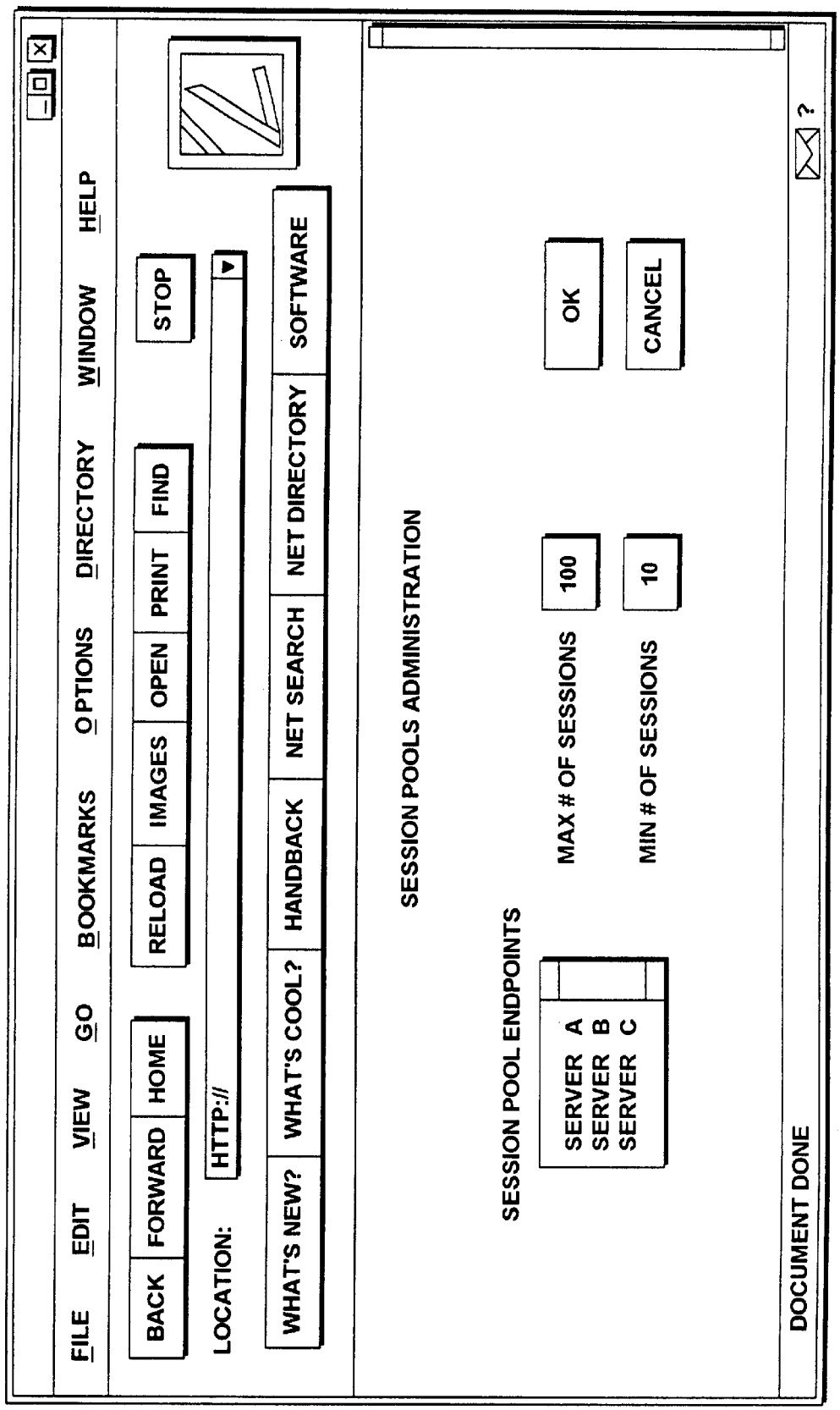
FIG. 1b illustrates an administrative page facility used by the gateway component of the present invention.

Next, component 10-41 sets values defining the number of initial and maximum session connections (i.e., block 10-41*c*2) for defining preset minimum and maximum limits within which the number of session connections to be expanded and contracted according to usage. The minimum and maximum values are obtained from information included in the configuration file 10-15 or received from a command line or from the administrative page of FIG. 1*b*. For each session pool entry, component 10-41 opens the initial number of session connections and builds a corresponding number of session pool entries for the table (i.e., block 10-41*c*3). As each session pool entry is created, component 10-41 marks the entry as "shared" (i.e., block 10-41*c*4). This allows the entry to be returned to the session connection pool when a particular session connection is logically closed. Session pools that are not pre-established (i.e., not specified in the configuration file 10-15 or on a command line) are created dynamically upon receipt of a URL context field value =1 request for a non-existent session pool.

Description of URL Encoding for Persistent Session Connections

The preferred embodiment of the present invention makes use of the standard Uniform Resource Locator (URL) in establishing persistent session connections using session pools. By encoding all required connection information into the URL as described herein in greater detail, the present invention avoids unnecessary scanning of HTTP headers for "Cookies" and hidden form fields as in prior art approaches utilized for maintaining state information. This approach provides optimum performance when used in a high volume enterprise computing environment. Moreover, it allows use of standard browser software and standard HTTP protocols as discussed herein.

By way of background, the URL is a standard way to specify the location of a resource (e.g. document) anywhere on the World Wide Web. The exact specification of the URL is defined by the specification RFC 1738 that can be located at w3.org/hypertext/WWW/Addressing/Addressing.html. A URL is composed of three pieces of information:

1. Protocol name—typically HTTP
2. Server address
3. Resource name (e.g a file on a Web server).

The forms of URLs include absolute and relative. An absolute URL specifies all of the addressing information—protocol, server address, and a resource name that is necessary to locate the desired resource. By contrast, a relative URL (e.g. document) contains only a relative file name. The pathname supplied is relative to the path or directory of the referencing document. Thus, relative URLs allow collections of documents to be moved from one directory to another without affecting the links contained in the documents.

As well known in the art, browsers combine relative URLs with a document "base" value to form an absolute URL. Every time a browser makes a request for a document, it "remembers" the base name of the document for use in forming absolute URLs for any "HREF" field that specifies a relative name. The HREF field is contained within an HTML anchor element <A> included within the document for specifying a hyperlink (i.e., resource requested when the link is selected by a user). For more information regarding the use of such fields, reference may be made to the Bull HN Information Systems Inc. publication entitled, "Distributed Computing Web 8 User's Guide GCOS 8, order number 67 A2 RJ10 Rev01, Version 3.0, dated July 1998.

When browser component 10-2 connects to server system 20 using the transaction gateway component 10-4, a persistent connection is established for conducting a DSA session. This enables the browser component 10-2 to reuse the DSA persistent connection for every subsequent message.

To accomplish this, the gateway component 10-4 retrieves information from the URL of each new message and selects a specific DSA connection based on the part of the URL that contains a session context identifier.

As discussed above, a URL is composed of a protocol name, server address, and resource name. In the preferred embodiment, the resource name specifies information that is used by the gateway component 10-4 to execute a specific transaction. The general format of a Web URL used by the system of FIG. 1 is as follows:

gateway/node.mailbox.protocol/session context identifier/tp8_command/options where:

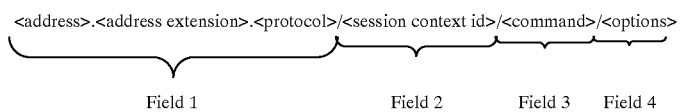

The protocol and gateway address portions of a URL are the same as for a conventional URL that targets any Web server. The format of the rest of the URL is unique to the present invention, as explained herein.

The resource-name portion of the URL consists of four distinct fields.

<address>.<address extension>.<protocol>/<session context id>/<command>/<options>

Field 1     Field 2     Field 3     Field 4

The first field (field 1) specifies the address of the application server. The "protocol" portion specifies the session protocol to be used when establishing a session between the client and the server. Examples of possible protocols and their keywords are:

SNA Proprietary IBM protocol.

DSA Proprietary Bull Information Systems protocol based on OSI. This is the default protocol in the preferred implementation. The default protocol can be set using an administrative page provided through a further port connection associated with the gateway component 10-4.

SOCK Standard UNIX sockets protocol.

The remainder of this description assumes a URL where the DSA protocol has been selected in which case the URL looks like this:

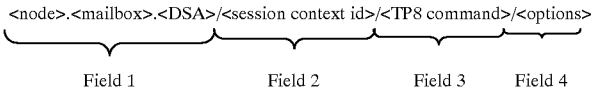

<node>.<mailbox>.<DSA>/<session context id>/<TP8 command>/<options>

Field 1     Field 2     Field 3     Field 4

Assuming a DSA protocol, the first two elements of field I specifies a DSA node name and host mailbox for the desired enterprise server workstation. These values are used by the gateway component 10-4 to establish a connection to the target enterprise server workstation.

The second field is a context field (field 2) specifies a persistent session connection identifier value, which is guaranteed to be unique. The persistent session context identifier is assigned by the gateway component 10-4 when, for example, the browser component 10-2 submits a request that contains a zero in this field. That is, when the session context field is "/0/", the gateway creates a new DSA connection to the transaction processing (TP) enterprise server workstation that is identified by <node>.<mailbox>. When the connection is established, a unique connection identifier is assigned for conducting the session, and all additional requests from the browser component 10-2 specify the persistent session context identifier in place of the original "/0/".

The third field (field 3) of the resource name specifies a TP command to be executed.

The fourth field (field 4) is optional and is passed on without modification by the gateway component 10-4. This field is used to specify options to be used by the TPR transaction program. The TPR transaction program uses a "HTTP_GETPATH" API routine to obtain the value of the options field. Reference may be made to the Appendix in the above-cited Bull Web8 User Manual for descriptions of this API.

Note that the TP command name does not appear at the beginning of the input message. To enable the use of default TP command processing, the gateway component 10-4 reorganizes or repackages (i.e., encapsulates) the URL so that it appears to TP to be a native TP command. This obviates the need to change the TP executive software. The gateway component 10-4 copies the TP command name to the beginning of the input message. For example, consider the following URL.

gateway/sys1.tp8ws/0/logon/12345

When processing this URL, the browser component 10-2 makes a connection to the gateway component 10-4 at IP address "gateway" and uses the "http" protocol to submit a "GET" request. The HTTP request message sent by the browser component 10-2 to the gateway component 10-4 is:

GET/sys1.tp8ws/0/logon/12345 HTTP/1.0

The gateway component 10-4 examines this message and copies the TP command name to the beginning of the message. The message submitted to TP is:

logon context=<cid>.<tod><CRLF>
<CRLF>
GET/sys1.tp8ws/0/logon/12345 HTTP/1.0

In this example, the gateway component 10-4 copied the "logon" command name to the beginning of the message. In addition, the gateway component 10-4 detected a session identifier of "/0/" and established a new persistent connection for conducting a browser session. Because the gateway component 10-4 created a new persistent connection, the new connection identifier is also passed to the TPR transaction program as part of the message prefix.

The information added by the gateway component 10-4 must conform to the HTTP protocol specification to avoid any ambiguity during the processing of each input message. Consequently the line added by the gateway is terminated by a CRLF sequence. The CRLF (carriage return/line feed) is the standard HTTP protocol line terminator. This sequence is also referred to as a new line and typically appears in the document as <NL>. A line that consists of only the CRLF sequence is added to mark the end of the information in the gateway header. The original HTTP request submitted by the browser component 10-4 follows the "gateway" header. The description of the runtime library (i.e., API library 20-6) refers to this gateway header as an "environment." The HTTP_GETENV family of routines (which are described in the Appendix of the previously referenced Bull User Manual) are used to process the gateway header.

For the browser component 10-2 to submit requests using the newly created DSA session connection, the browser component 10-2 must determine that the base URL contains the newly assigned session context identifier. Continuing with the previous example, it is assumed that the gateway component 10-4 created a new connection and assigned a session context identifier of "1234. abcd". The message sent by the browser component 10-2 to the server system 20 then is:

logon context=1234.abcd<CRLF>
<CRLF>
GET/sys1.tp8ws/0/logon/12345 HTTP/1.0

Usually, if the page returned by the LOGON command contains a relative URL, the browser component 10-2 forms a new absolute URL using the current document base, which in this example is:

gateway/sys1.tp8ws/0/.

However, using this document base results in yet another DSA session connection being created, and the new message is sent to the new session connection. To send messages to the DSA session connection that was created for the LOGON request, the browser component 10-2 must establish that the document base is actually:

gateway/sys1.tp8ws/1234.abcd/.

The HTML specification provides a convenient mechanism for this purpose; the <BASE> tag. The HTML <BASE> tag provides a standard method for an application to explicitly specify the base for the document that contains the <BASE> tag. Using the <BASE> tag, the TP transaction application program can use the HREF attribute to specify any arbitrary document base. In our example, the application would generate the following sequence of HTML in response to the original LOGON request:

<HTML>
<HEAD>
<BASE HREF="http://gateway/sys1.tp8ws/1234.abcd/">
</HEAD>.

When the browser component 10-2 receives a document that contains the <BASE> HTML element, the browser component 10-2 uses the information provided in the HREF attribute to resolve any relative references that are contained within the HTML document.

Because most TP Web applications need to generate <BASE> tags, the API library 20-6 of the enterprise server software includes the HTML_BASE routine illustrated in the Appendix, which can be used to generate the complete <BASE> element. The routine returns the result to the TPR transaction program, which can then include the generated <BASE> in Web pages.

The gateway component 10-4 requires the TPR transaction program to define an additional application-specific suffix for the session context identifier. The session context identifier generated by the gateway component 10-4 contains two values and the complete session context identifier includes a third value that contains an application-specific value.

A TPR transaction application program must specify an application-context value whenever the <BASE> is generated. This context value must be non-zero, and has a maximum size of 32 bits.

In addition, an application can specify a new application-specific value at any time to provide additional control over the application. Changing this portion of the session context identifier prevents the user from submitting requests from bookmarks, thus providing an additional form of protection against misuse.

Whenever a TPR transaction program assigns a new application-context value, the new base information must be provided to the browser component 10-2 via the <BASE> element. In addition, the gateway component 10-4 must be notified of the new application context. Communication between the TPR transaction program and the gateway component 10-4 takes place on the HTTP status-response line using the message portion of the status record. If the TPR transaction program wants to set the application-context value to "5678", then the complete session context identifier in the example is:

1234.abcd.5678.

The TPR transaction program is responsible for generating the complete HTTP response header and the HTML document. The HTTP response begins with an HTTP status, which includes a numeric completion-status code and a text message. In non-Web environments, the text portion typically is ignored and is provided only as a convenience for debugging the HTTP protocol. In the preferred embodiment, this field is used to communicate from the TPR transaction program to the gateway component 10-4.

The message sent to the browser component 10-2 includes an HTTP response header that identifies the new application-context value, and an HTML <BASE> element that identifies the complete session context identifier.

HTTP/1.0 200 CONTEXT=5678<NL>

Content-type: text/html<NL>

<NL>

<HTML>

<HEAD>

<BASE HREF="http://gateway/sys1.tp8ws/1234.abcd.5678/">

</HEAD>

<BODY>

Rest of HTML response goes here

</BODY>

</HTML>

The above example shows an HTTP response header that conforms to the HTTP version 1.0 specification. The completion code of "200" (i.e. described in the HTTP1.0 and HTTP1.1 specifications) indicates that the request was processed successfully. The text that follows the completion code contains the reserved word "CONTEXT=" and the new application-context value of "5678". The gateway component 10-4 copies this value to the PST entry allocated to the current DSA session connection.

Any subsequent input message that specifies the gateway context identifier is validated by the gateway component 10-4 to include the correct time-of-day and application-context value. Failure to match on either field results in an HTTP response indicating that the requested resource was not found.

In addition, the <BASE> header element contains the complete session context identifier, including the application-context value. The browser component 10-2 uses this new base information when constructing absolute URLs for the links that are included in the current document.

DESCRIPTION OF OPERATION

Figure 4:
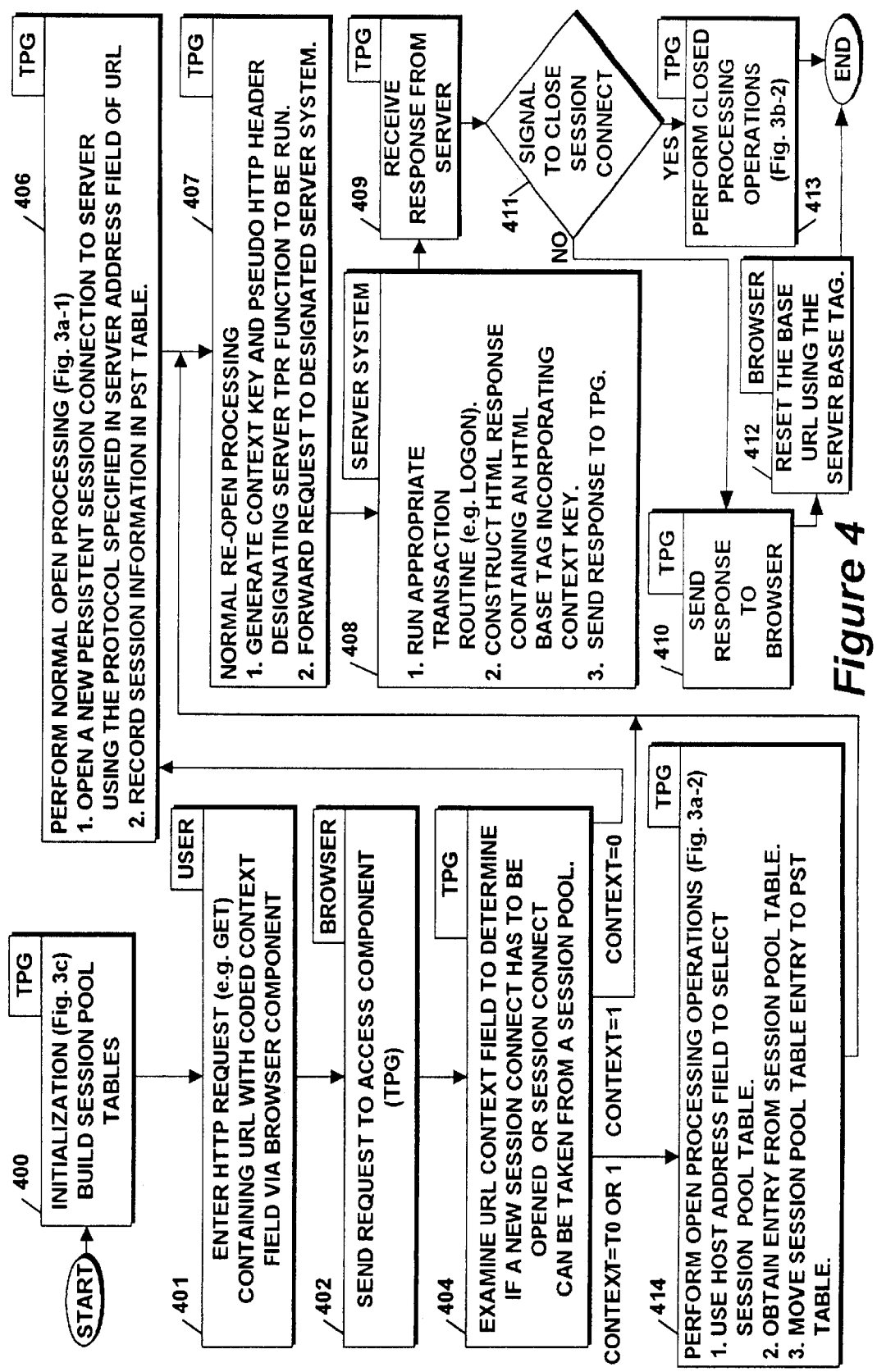
FIG. 4 is a flow diagram used to describe different capabilities of the preferred embodiment of the present invention in establishing and managing persistent session connections using session pools.

The overall operation of the preferred embodiment of the present invention will now be described with respect to FIGS. 1 through 5b. The flow chart of FIG. 4 illustrates the overall operation in establishing and using persistent session pool connections according to the teachings of the present invention. Referring to FIG. 4, it is seen that at startup time, component 10-4 executes the initialize process of block 400. That is, component 10-4 executes the operations of FIG. 3c in building the master session pool table 10-47a of FIG. 5a and the session pool tables in accordance with the number of endpoints listed in configuration file 10-15 or command lines or provided via the administrative page of FIG. 1b. In greater detail, assume that either the configuration file 10-15 or administrative page of FIG. 1b lists three endpoints A, B, and C.

As discussed above, component 10-4 first builds the master session pool table 10-47a having three entry locations corresponding to the number of endpoints. As each of the session pool tables A, B, and C is created, the entry that will be used to locate the table is stored as an index value in one of the locations of master session pool table. The location is allocated according to the server address (i.e., the host address portion that will be contained in the URL designating that endpoint). This value is used as an index into the master session pool table location that stores the index value used to locate the particular session pool table.

The number of initial and maximum session connections in each session pool table is set by component 10-4 according to information contained in configuration file 10-15 or from the administrative page via administrative port 10-8b. For example, the administrative page of FIG. 1b specifies initial minimum and maximum values of 10 and 100 respectively. For ease of illustration, FIG. 5a illustrates session pool tables 10-47b, 10-47c and 10-47d as having three, two and four session pool connection entries respectively. It will be noted that all of the session connections in each pool have the same endpoint so that the session connections from the pool can be used interchangeably. Thus, the three session connections for server A are in session pool table A, the two session connections for server B are in session pool table B and the four session connections for server C are in session pool table C. Also, as indicated in FIG. 5a, multiple session pools are build for servicing multiple endpoints.

Referring to FIG. 4, it is seen that it is assumed that the user at the client system 10 enters an HTTP request containing a URL with a context field equal to "1" via the browser component 10-2(i.e., block 401). More specifically, the user enters a URL containing the usual fields plus a context key field containing a value of one (e.g. via keyboard 10-12 of FIG. 1). By way of example, the user enters the following URL:

sandpiper:8080/ph45.web8.dsa/1/logon where:

| | |
|---|---|
| sandpiper:8080 | address of the TPG component 10-4; |
| ph45.web8.protocol | address of the server system 20-1 (protocol is the protocol to be used between the TPG component 10-4 and the server system 20 (e.g. DSA, SNA or SOCK); |
| 1 | value of the context key; |
| logon | target transaction/application. |

Next, the browser component 10-2 sends the request via the HTTP protocol to the TPG component 10-4 in a conventional manner (i.e., block 402). The TPG component 10-4 listening on the configured port (e.g. 8080) receives the input connection request and examines the URL's context field value (i.e., block 404). The specific coding of this value enables the component 10-4 determine if browser component 10-2 has requested that a new session connection be opened or has requested that an existing or pre-established session connection is to be used for forwarding the request to the designated server system 20-1. As indicated in block 404, TPG component 10-4 examines the context field value and in this case, sees that it has a value of one. This signals that a session is required but the session connection can be taken from a session pool which in this case corresponds to session pool table A structure 10-47b of FIG. 5a.

Before describing the operations of block 414, it will be noted that when the context value=0, this signals that a new session connection is to be opened. This causes TPG component to execute the operations of block 406 of FIG. 4. These operations are described in the referenced parent patent application.

Now referring back to the example, as mentioned, the context=1 signals that a new session connection is required but the session connection can be taken from a pool, if the endpoint exists and if a session connection is available in that pool. As indicated in block 414, TPG component 10-4 executes the open processing operations depicted in FIG. 3b-2. More specifically, component 10-4 uses the URL server address value to locate the appropriate session pool table (i.e., session pool table A) via the index value obtained from master session pool table 10-47a of FIG. 5a.

Figure 5B:
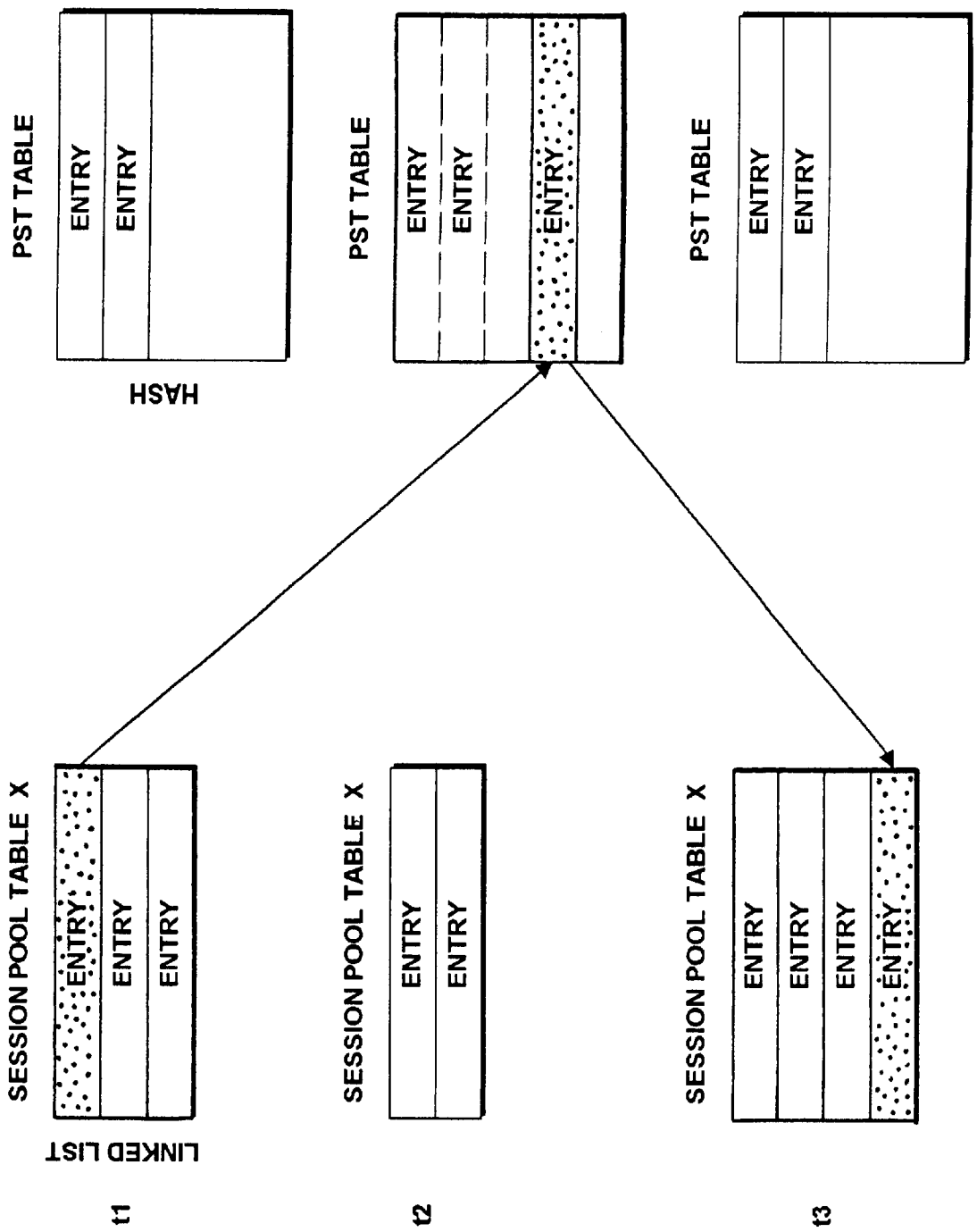

FIG. 5b illustrates the management of session pool entries by component 10-4. All of the session connections in operation are managed from one table that is the PST table 10-48. Thus, when in operation, there is no distinction as to whether the session connection came from a pool or not. As indicated, first (i.e., time t1) an available entry is located in the appropriate session pool corresponding to that of server A. The session pool table structure is implemented as a linked list wherein the first entry will suffice. Next, (i.e., time t2) the entry is moved to the PST table 10-48 as indicated by the dotted blocks in FIG. 5b. Since the PST table 10-48 is implemented as a hash table, the entry is appropriately "hashed".

As indicated in block 414 and FIG. 3a-2, assuming that there is an entry in the particular session pool table, component 10-4 moves the session table entry into the PST component 10-48. This entry includes the same information as contained in the PST component 10-48. More specifically, the entry contains the following information:

```
class DSAContextEntry {
    private dsa_connection connection  = null; // connection object
    private String connName             = null; // connection obj name
    private long connIndex              = 0;    // connection obj index
    private long time                   = 0;    // TOD session was
created
    private boolean sessionOpen         = false; // session state
    private String appval               = "0";   // value supplied by app
    private long lastAccessTime         = 0;    // TOD for time-out
    private sessPool pool               = null; // ref to pool source
}
```

As indicated in block 414, TPG component 10-4 moves the session pool table entry to an available one of the locations of PST table 10-48.

Next, as indicated in block 407, the TPG component 10-4 performs normal system processing. That is, TPG component 10-4 generates a unique context key value. The context key value consists of the following three parts: (X) Time of day in milliseconds as required for uniquely identifying the PST session entry; (Y) Token to access the session entry in the PST table 10-48 and (Z) Optional server application specific value which can be used to invalidate an HTML link.

As previously discussed, the server application value (Z) can be used by an application to invalidate links on "back" browser pages and to prevent requests being made from "bookmarked" pages. The value of Z is updated in the PST table 10-48 by TPG component 10-4 each time a response is sent from a particular server system to the client system 10. If a new BASE is generated by the TPR application with the new Z value, the browser component 10-2 will build a page using the new BASE. This means that relative links on the new page will be built using the new context and, more specifically, the new Z value. Subsequent requests from the browser component 10-2 with a Z value other than the current Z value in the PST table 10-48 (that is, build with an out-of-date context) will be rejected. Thus, only links with the latest context are considered valid.

Also, as indicated in block 407, TPG component 10-4 generates a pseudo HTTP header having the format:

logon context=x.y.z
<nl> where logon in the present example is the target application obtained from the URL and specifies the transaction routine (i.e., logon TPR 20-2a) to be run on server system 20. Next, TPG component 10-4 forwards the HTTP header and body from the browser component 10-2 to server system 20 as indicated in block 407. The browser request processing component 10-40 forwards the request using the persistent session connection in the process of being established on the client system 10 by the TPG component 10-2. To complete the persistent session connection, as discussed herein, the server system 20-1 cooperates by furnishing a base tag value that enables complete identification of the session connection by both systems.

As indicated in block 408, upon receipt of the transaction name (i.e., logon), server system 20 invokes the logon transaction processing routine (TPR) 20-2a (i.e., item 3 in FIG. 4b). The TPR 20-2a during its normal processing constructs an HTML response. Part of this response includes an HTML BASE tag that incorporates the context key. The TRP 20-2a does this by calling the BASE routine contained in API library 20-6. The server system 20-1 sends the response to TPG component 10-4 over the established persistent session connection.

As indicated in block 410, the response processing component 10-42 of TPG component 10-4 forwards the server system response to browser component 10-2 via the HTTP protocol over a non-persistent connection established via "sockets" (i.e., since this is a newly established connection blocks 409 and 411 can be ignored). The component 10-42 forwards the BASE tag to component 10-40. As indicated in block 412, using the BASE tag, browser component 10-2 resets the base URL in a standard manner. The result of this operation is that any link that the user selects will cause the browser component 10-2 to form an address based on the reset URL base and the link information. Thus, link addresses will have URLs that contain the context key.

During operation, component 10-4 uses the generated context key value (i.e., x.y.z) to locate the session information pertaining to the persistent connection in the PST component 10-48. The TPG component 10-4 passes the data received from browser component 10-2 to server system 20-1 over the persistent session connection located by the context key value. As indicated in FIG. 4, this cycle of operation is repeated during the execution of a transaction processing application program (e.g. TPR 20-2b).

Upon completing the processing of all required transactions, the browser user can then generate a request signaling termination of the session. More specifically, the browser user generates a request to execute a "logoff" TPR (i.e., a request to be disconnected from server system 20).

In greater detail, the browser user enters the following URL:

sandpiper: 8080/ph45.web8.dsa/x.y.z/logoff where the target transaction/application specified is TPR 20-2c. This causes TPG component 10-4 to forward to server system 20-1, the browser initiated HTTP GET request having the format:

GET/ph45.web8/x.y.z/logoff HTTP/1.0.

This results in server system 20-1 invoking logoff TPR 20-2c. TPR 20-2c provides the appropriate response to browser component 10-2 by including a CONTEXT=0 in the response status line, i.e., HTTP/1.0 200 CONTEXT=0. This is the signal from the host system to TPG component 10-4 to close the session connection. Upon receipt of the signal to close the session connection (i.e. block 411), component 10-4 performs the close process of FIG. 3b-2 (i.e., block 413). Briefly, if the session connection being closed is marked "shared" (i.e., it came from a session pool) and if the number of session connections in that pool has not exceeded the pool maximum, component 10-4 removes the entry from PST table 10-48. This operation is illustrated in FIG. 5b. As indicated, the entry designated by the dotted block is removed and added to the session pool table by reinsertion into the session pool linked list structure. When the above two conditions are not met, then component 10-4 executes the normal close process of FIGS. 3b-1 and 3b-3. That is, TPG component 10-4 closes the browser socket connection used for communicating with browser component 10-2. Also, when such session closing takes place, TPG component 10-4 removes the session entry information from PST table component 10-48.

As indicated in block 410 of FIG. 4, the TPG component 10-4 passes the server system's response to browser component 10-2 and resets the base URL (i.e., block 412).

The session connection may be closed by TPG component 10-4 because of browser user inactivity or by the server system via sending a close response. In the case of inactivity, if no traffic is seen on a session over a specified time interval, the session is considered to be inactive. In the preferred embodiment, a default time-out interval of 10 minutes is established by TPG component 10-4 but this value can be varied administratively. For example, the value can be established by accessing the administrative page via administrative port 10-8b (e.g. port 8081) associated with TPG component 10-4.

The described technique of using specially encoded URL fields (i.e., context key and option values) allows TPG component 10-4 to utilize pre-established session pool connections to map non-persistent sessions between browser component 10-2 and TPG component 10-4 to persistent session connections between TPG component 10-4 and a number of server systems.

From the above, it is seen how the TPG component of the preferred embodiment according to the teachings of the present invention manages session pool persistent session connections in response to browser user requests in a manner that provides high performance. By managing all session pool connections from a single table structure, this eliminates the need to distinguish between whether a session connection came from a session pool or from other source.

The foregoing discussion of the present invention has been presented for the purposes of illustration and description. Further descriptions are also provided in the Appendices. Such descriptions are not intended to limit the teachings of the present invention to the forms and implementations disclosed herein. Consequently, many variations and modifications commensurate with the above teachings, within the skill and knowledge of the relevant art, are within the scope of the present invention. For example, the teachings of the present invention should not be limited to the types of context field coding disclosed, the type of client system and server systems described or to the specific type of software disclosed herein.

Express Mail Label No.
EI585425165US
52-3172

-35-

APPENDICES

I. Class Diagrams and Program
II. GTEA component 10-5
III. API library 20-6

E... ss Mail Label No.
EI585425165US
52-3172

I. Class Diagrams and Program Flow

As previously indicated, the preferred embodiment of the TPG component 10-4 of present invention is constructed as a set of cooperating objects using well-known patterns to facilitate flexibility and to readily enable such features as the ability to dynamically
5 specify a per-session protocol. The use of well-known patterns is described in the text by Gamma, Erich et al entitled "Design Patterns: Elements of Reusable Object-Oriented Software", published by Addison-Wesley, 1995.

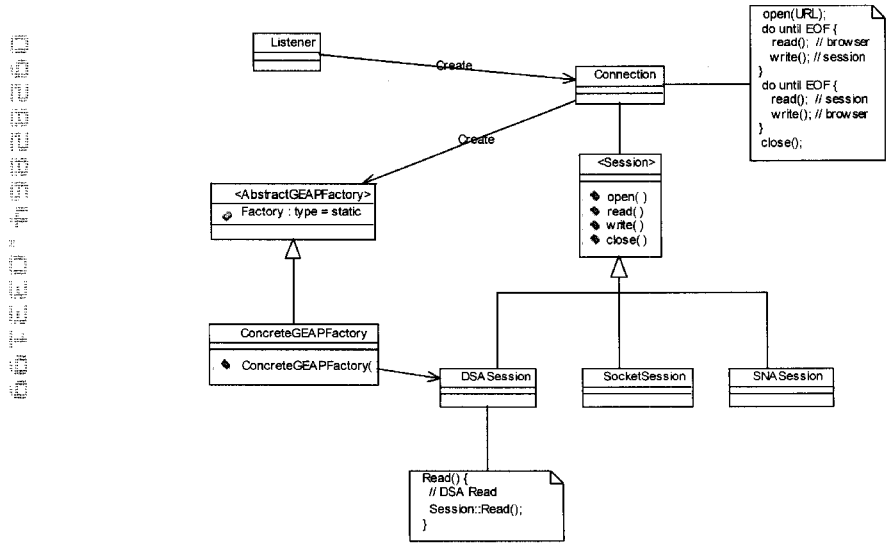

10 Diagram A: Principle TPG Classes

The diagrams contained herein illustrate the specific classes used in implementing TPG component 10-4. More specifically, diagram A shows the principal TPG component classes.

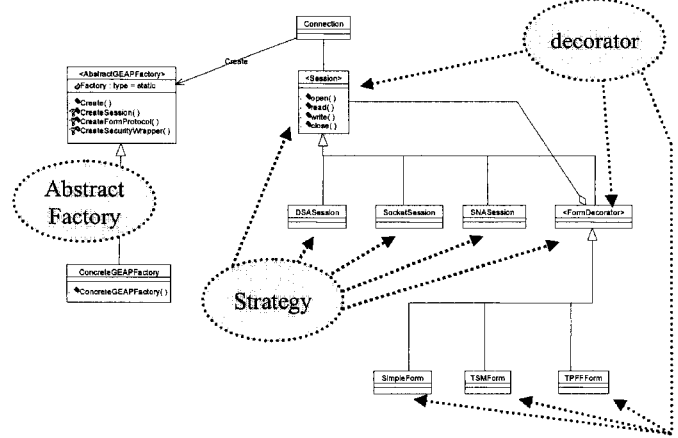
Diagram B: Patterns used in TPG
Diagram B shows some of the patterns used and diagram C shows some addition classes including remote form classes.

Ex s Mail Label No.
EI585425165US
52-3172

-38-

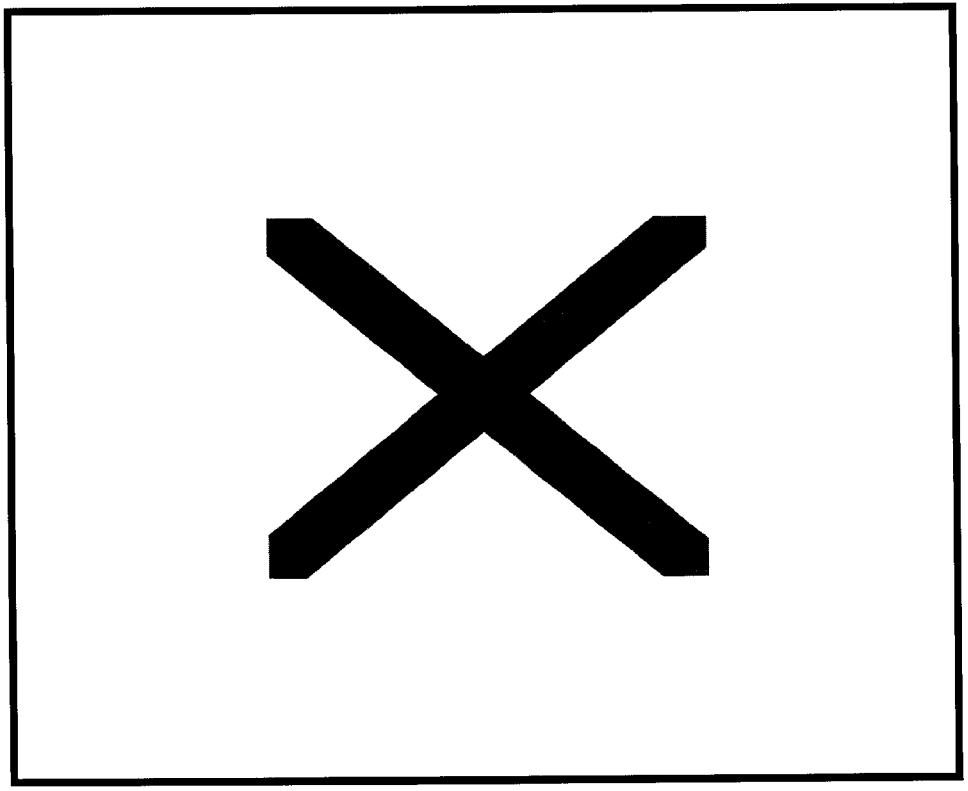

Diagram C: Some addition TPG classes including remote form classes.

Diagrams A through C use a popular OO design notation called Unified Modeling Language (UML) to illustrate class relationships. For further information about such notation, reference may be made to the text by Pierre-Alain Muller, entitled "Instant UML", published by Wrox Press Ltd, 1997.

To give a better understanding or "feel" of the flow of TPG component 10-4, a partial trace of the execution of TPG component 10-4 is illustrated in below. The intent E       ss Mail Label No.
EI585425165US
52-3172

-39- is to indicate the flow of TPG component 10-4 and to illustrate some of the class/object and protocol interaction.

By way of background, TPG component 10-4 is composed of a set of the following co-operating objects.

5   A *Listener* or main object listens on a configurable port for incoming connections from a browser. The *Listener* object, upon receiving a connection, creates a *Connection* object. The *Connection* object creates a *Factory* object.

The *Connection* object calls the *Factory* Create method passing it the URL received from the browser component 10-2. The *Factory* object creates a *DSASession* object.

10  TPG component 10-2 uses Strategy, Decorator, and Abstract Factory patterns to ensure that the design is open to extension. Additional functions can be added to TPG component 10-4 without changing existing classes. The only change is the Factory class so that the Factory can build the new objects. It will be appreciated that no change would be necessary if the "Factory" object was driven from a configuration file. However, since 15  configuration files cause other problems, this approach is not used.

As illustrated herein, to extend TPG component 10-4, it is only necessary to write a new class which implements the new functionality, tell the Factory about the new class and add the classes to the class library.

20  The SocketSession Class handles TCP/IP communications between browser component 10-2 and TPG component 10-4. The class can be used to also handle communications between TPG component 10-4 and a standard (i.e. non-proprietary) HTTP Web server.

TPG component 10-4 is capable of receiving multiple overlapping requests from 25  the same browser component. TPG component 10-4 processes multiple simultaneous requests with the same context by serializing the requests in the case of *DSASession*. The *Connection* object will queue and dequeue the requests. The dequeue method is an abstract method that is implemented for each session type derived class. In this way, the decision to serialize or not is implemented by each derived session class.

Ex s Mail Label No.
EI585425165US
52-3172

-40-

The following edited trace and screen-shots show a session where a users logs on, executes a query and logs off.

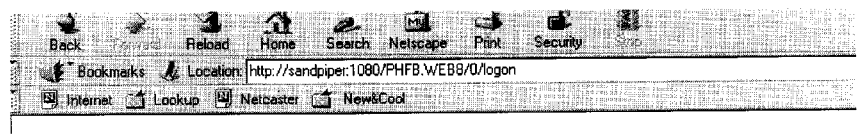

5

Diagram 1 : User enters URL for initial screen

```
16:32:48  main       Listener: listening on port 1080
16:33:27  Thread-1   New connection opened on port: 2432 Local port: 1080
16:40:12  Thread-1   Connection.constructor: new thread 16:40:12  Thread-19  Connection.run:
16:40:12  Thread-19  ErrorMessage.init():  out = java.io.DataOutputStream@24fe49, in =
java.io.DataInputStream@24fe46
16:40:12  Thread-19  GET /PHFB.WEB8/0/logon HTTP/1.0
16:40:12  Thread-19  Form.open : GET /PHFB.WEB8/0/logon HTTP/1.0
16:40:12  Thread-19  DataCache.open : GET /PHFB.WEB8/0/logon HTTP/1.0
16:40:12  Thread-19  DataCache.open calling next wrapper:
com.bull.GEAP.DSASession@24fa3f
16:40:12  Thread-19  DSASession.open  : GET /PHFB.WEB8/0/logon HTTP/1.0
16:40:12  Thread-19  DSASession.open  : context[0] = 0
16:40:12  Thread-19  DSASession.openNewSession  calling DSA open: conn = null
16:40:12  Thread-19  DSASession.openNewSession  opening DSA session: IP = PHFB, node = ,
mailbox = WEB8, turn = false
16:40:12  Thread-19  * ConTextEntry *
16:40:12  Thread-19  ** connection = com.bull.tcpdsa.dsa_connection@24f2fb
16:40:12  Thread-19  ** time        = 907605612255
16:40:12  Thread-19  put: entry = com.bull.GEAP.ContextEntry@24e831
16:40:12  Thread-19  Connection.run:   : HTTPMethod: GET 16:40:12  Thread-19  Connection.run:  *** reading and sending browser header ***

16:40:12  Thread-19  Connection.run:   calling write (23): GET /0/logon HTTP/1.0
16:40:12  Thread-19  Form.write (string)  calling next wrapper:
com.bull.GEAP.DataCacheSession@24f9c7
16:40:12  Thread-19  DataCache.write (string)  calling next wrapper:
com.bull.GEAP.DSASession@24fa3f
16:40:12  Thread-19  DSASession.write (string):  writing (68): logon
CONTEXT=24f2fb.d3518296df
GET /PHFB.WEB8/0/logon HTTP/1.0

16:40:12  Thread-19  Connection.run:   calling write (87): Referer:
http://sandpiper:1080/PHFB.WEB8/24f405.d351822dfe.3618E7BC/logoff/logoff.htm
16:40:12  Thread-19  Form.write (string)   line = Referer:
http://sandpiper:1080/PHFB.WEB8/24f405.d351822dfe.3618E7BC/logoff/logoff.htm
16:40:12  Thread-19  Form.write (string)  calling next wrapper:
com.bull.GEAP.DataCacheSession@24f9c7
16:40:12  Thread-19  DataCache.write (string)  calling next wrapper:
com.bull.GEAP.DSASession@24fa3f
16:40:12  Thread-19  DSASession.write (string):  calling next wrapper:
com.bull.GEAP.NULLSession@24faa6
```

E    ss Mail Label No.
EI585425165US
52-3172

-41-

```
16:40:12  Thread-19  DSASession.write (string):  writing (87): Referer:
http://sandpiper:1080/PHFB.WEB8/24f405.d351822dfe.3618E7BC/logoff/logoff.htm
16:40:12  Thread-19  Connection.run:   calling write (24): Connection: Keep-Alive
16:40:12  Thread-19  Connection.run:   calling write (43): User-Agent: Mozilla/4.5b2 [en]
(WinNT; I)
16:40:12  Thread-19  Connection.run:   calling write (22): Host: sandpiper:1080
16:40:12  Thread-19  Connection.run:   calling write (77): Accept: image/gif, image/x-
xbitmap, image/jpeg, image/pjpeg, image/png, */*
16:40:12  Thread-19  Connection.run:   calling write (23): Accept-Encoding: gzip
16:40:12  Thread-19  Connection.run:   calling write (21): Accept-Language: en
16:40:12  Thread-19  Connection.run:   calling write (36): Accept-Charset: iso-8859-
1,*,utf-8
16:40:12  Thread-19  Connection.run:   writing <CRLF>
16:40:12  Thread-19  DSASession.write (string):  writing (25): Accept: text/geapform
16:40:12  Thread-19  Connection.run:   ***** reading and sending browser body *****
16:40:12  Thread-19  Connection.run:    contentLength = 0
16:40:12  Thread-19  DSASession.turn:  updating time-out value907605612665
16:40:12  Thread-19  Connection.run:   ***** reading and sending server response *****
16:40:12  Thread-19  Form.readLine:
16:40:12  Thread-19  Form.readLine:  calling next wrapper:
com.bull.GEAP.DataCacheSession@24f9c7
16:40:12  Thread-19  DataCache.read (string)
16:40:12  Thread-19  DataCache.read (string)  calling next wrapper:
com.bull.GEAP.DSASession@24fa3f
16:40:12  Thread-19  DSASession.readLine():
16:40:12  Thread-19  DSASession.byte[] readDSA():  line = HTTP/1.0 200 CONTEXT=3618E7D7
Content-type: text/html
Pragma: no-cache <html><head>
<title>WEB8 Logon accepted</title>
<base href="http://sandpiper:1080/PHFB.WEB8/24f2fb.d3518296df.3618E7D7/">
</head>
<body><h1>WEB8 Logon Accepted</h1><hr>
Your WEB8 Logon has been processed.  Click <a href="file/default.html">here</a> for
additional options.</body>
</html>

16:40:12  Thread-19  DSASession.readLine():  token = HTTP/1.0 200 CONTEXT=3618E7D7
16:40:12  Thread-19  Connection.run:  writeBytes(): writing to browser: HTTP/1.0 200
CONTEXT=3618E7D7
16:40:12  Thread-19  DSASession.readLine():  token = Content-type: text/html
16:40:12  Thread-19  Connection.run:  writeBytes(): writing to browser: Pragma: no-cache
16:40:12  Thread-19  Connection.run:  ***** reading and sending server body *****
16:40:12  Thread-19  Connection.run:   : content len = 0, reading from server
16:40:12  Thread-19  DSASession.byte[] read():
16:40:12  Thread-19  Form.[]read:  back from wrapper:
com.bull.GEAP.DataCacheSession@24f9c7
16:40:12  Thread-19  <html><head>
<title>WEB8 Logon accepted</title>
<base href="http://sandpiper:1080/PHFB.WEB8/24f2fb.d3518296df.3618E7D7/">
</head>
<body><h1>WEB8 Logon Accepted</h1><hr>
Your WEB8 Logon has been processed.  Click <a href="file/default.html">here</a> for
additional options.</body>
</html>

16:40:12  Thread-19  Connection.run:  write(): writing to browser: 295
16:40:12  Thread-19  Connection.run:  contentLength = 0
16:40:13  Thread-19  Connection.run:  End task
```

Ex ss Mail Label No.
EI585425165US
52-3172

-42-

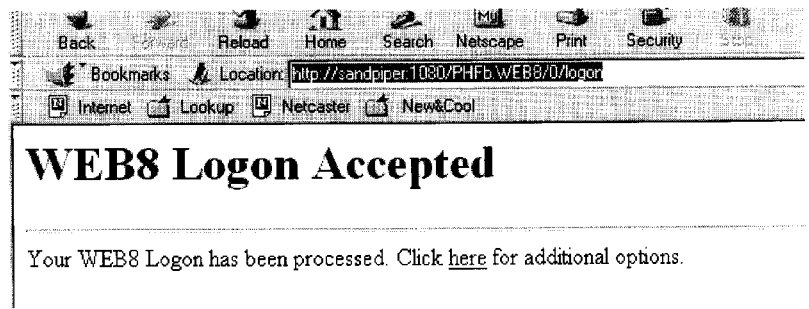

Diagram 2: User clicks *here* for options

```
  5

16:41:20  Thread-1   New connection opened on port: 2472 Local port: 1080
 10  16:41:20  Thread-20  GET /PHFB.WEB8/24f2fb.d3518296df.3618E7D7/file/default.html HTTP/1.0
     16:41:20  Thread-20  DSASession.open  : GET
     /PHFB.WEB8/24f2fb.d3518296df.3618E7D7/file/default.html HTTP/1.0
     16:41:20  Thread-20  DSASession.processContext   context = 24f2fb.d3518296df.3618e7d7
     16:41:20  Thread-20  *context table*
 15  16:41:20  Thread-20  *connIndex   : 2421499
     16:41:20  Thread-20  *Connection : 24f2fb
     16:41:20  Thread-20  *Time        : d3518296df
     16:41:20  Thread-20  *Sequence    : 3618E7D7
     16:41:20  Thread-20  *LastAccess  : 907605612255
 20  16:41:20  Thread-20  get: key = 2421499
     16:41:20  Thread-20  DSASession.processContext   retrieved conn =
     com.bull.tcpdsa.dsa_connection@24f2fb
     16:41:20  Thread-20  NULLSession.open : GET
     /PHFB.WEB8/24f2fb.d3518296df.3618E7D7/file/default.html HTTP/1.0
 25  16:41:20  Thread-20  Connection.run:   ***** reading and sending browser header *****
     16:41:20  Thread-20  Connection.run:   calling write (60): GET
     /24f2fb.d3518296df.3618E7D7/file/default.html HTTP/1.0
     16:41:20  Thread-20  DSASession.write (string): writing (104): file
     CONTEXT=24f2fb.d3518296df
 30
     GET /PHFB.WEB8/24f2fb.d3518296df.3618E7D7/file/default.html HTTP/1.0
     16:41:20  Thread-20  Connection.run:   calling write (24): Connection: Keep-Alive
     16:41:20  Thread-20  Connection.run:   calling write (22): Host: sandpiper:1080
     16:41:20  Thread-20  Connection.run:   calling write (77): Accept: image/gif, image/x-
 35  xbitmap, image/jpeg, image/pjpeg, image/png, */*
     16:41:20  Thread-20  Connection.run:   calling write (23): Accept-Encoding: gzip
     16:41:20  Thread-20  Connection.run:   calling write (21): Accept-Language: en
     16:41:21  Thread-20  Connection.run:   calling write (36): Accept-Charset: iso-8859-
     1,*,utf-8
 40  16:41:21  Thread-20  Connection.run:   writing <CRLF>
     16:41:21  Thread-20  Form.write (string)   line = Accept: text/geapform
     16:41:21  Thread-20  DSASession.write (string):  writing (25): Accept: text/geapform
     16:41:21  Thread-20  Connection.run:   ***** reading and sending browser body *****
     16:41:21  Thread-20  DSASession.turn: updating time-out value907605681084
 45  16:41:21  Thread-20  Connection.run:   ***** reading and sending server response *****
     16:41:21  Thread-20  Form.readLine: calling next wrapper:
     com.bull.GEAP.DataCacheSession@2583ac
```

Ex___s Mail Label No.
EI585425165US
52-3172

-43-

```
16:41:21  Thread-20  DataCache.read (string)  calling next wrapper:
com.bull.GEAP.DSASession@25844f
16:41:21  Thread-20  DSASession.byte[] readDSA():  line = HTTP/1.0 200 OK
Content-type: text/html
Pragma: no-cache
Date: Mon, 05 Oct 1998 15:39:08 GMT
Last-Modified: Tue, 07 Jul 1998 22:50:03 GMT <!DOCTYPE HTML PUBLIC "-//IETF//DTD HTML//EN">
<html>

<head>
<title>WEB8 default start page</title>
</head>

<body text="#000000" link="#0000FF">

<h1>DEFAULT.HTML - WEB8 default start page</h1>

<hr>

<p>This page was displayed because the URL did not specify a
specific document name. Like most WEB servers, the DOCS TPR will etc..

16:41:21  Thread-20  DSASession.readLine():  token = HTTP/1.0 200 OK
16:41:21  Thread-20  HTTP/1.0 200 OK
16:41:22  Thread-20  Connection.run:  End task
```

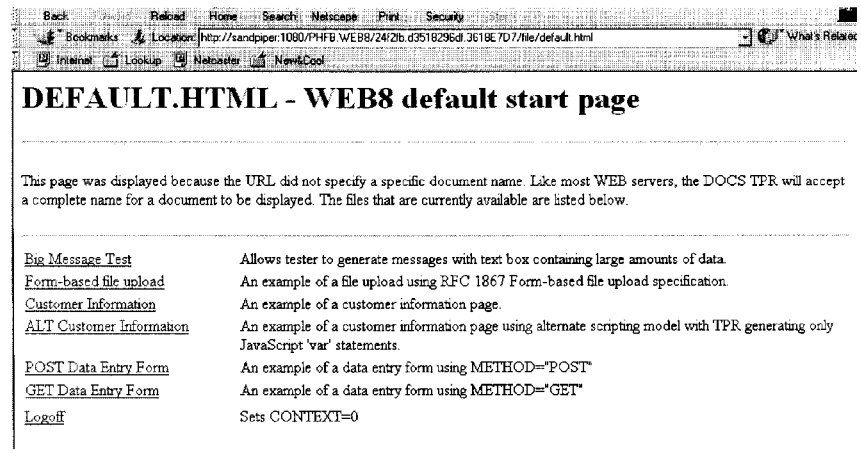

Diagram 3: User selects *Customer Information*

```
16:42:3  Thread-21  GET /PHFB.WEB8/24f2fb.d3518296df.3618E7D7/file/custinfo.htm HTTP/1.0
16:42:3  Thread-21  DSASession.processContext  context = 24f2fb.d3518296df.3618e7d7
16:42:3  Thread-21  DSASession.processContext  retrieved conn =
com.bull.tcpdsa.dsa_connection@24f2fb
```

Express Mail Label No.
EI585425165US
52-3172

-44-

```
16:42:3   Thread-21  Connection.run:    ***** reading and sending browser header *****

16:42:3   Thread-21  DSASession.write (string):  writing (104): file
CONTEXT=24f2fb.d3518296df GET /PHFB.WEB8/24f2fb.d3518296df.3618E7D7/file/custinfo.htm HTTP/1.0

16:42:3   Thread-21  Connection.run:    *** reading and sending browser body ***
16:42:3   Thread-21  Connection.run:    ***** reading and sending server response *****
16:42:4   Thread-21  DSASession.byte[] readDSA():  line = HTTP/1.0 200 OK
16:42:4   Thread-21  Connection.run:    writeBytes(): writing to browser: HTTP/1.0 200 OK
16:42:4   Thread-21  Connection.run:    ***** reading and sending server body *****
16:42:5   Thread-21  Connection.run:    End task
```

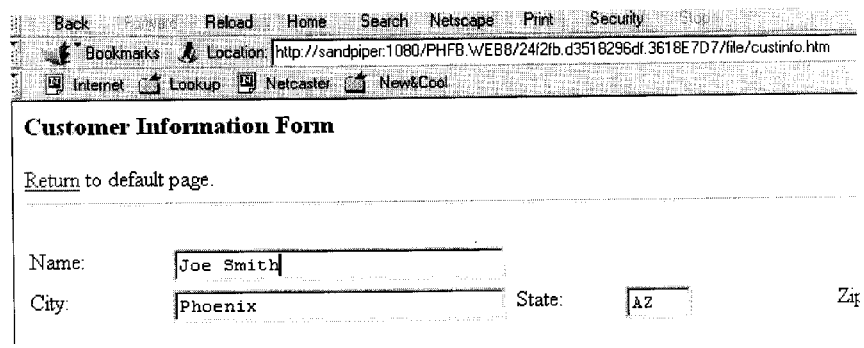

Diagram 4: Users *Returns* to mail page

```
16:42:51  Thread-22  GET /PHFB.WEB8/24f2fb.d3518296df.3618E7D7/file/default.html HTTP/1.0
16:42:51  Thread-22  Connection.run:    ***** reading and sending browser header *****
16:42:51  Thread-22  DSASession.write (string):  writing (104): file
CONTEXT=24f2fb.d3518296df GET /PHFB.WEB8/24f2fb.d3518296df.3618E7D7/file/default.html HTTP/1.0

16:42:51  Thread-22  NULLSession.write(string : Referer:
http://sandpiper:1080/PHFB.WEB8/24f2fb.d3518296df.3618E7D7/file/custinfo.htm 16:42:52  Thread-22  Connection.run:    *** reading and sending browser body ***
16:42:52  Thread-22  Connection.run:    *** reading and sending server response ***
16:42:52  Thread-22  DSASession.byte[] readDSA():  line = HTTP/1.0 200 OK
Content-type: text/html
Pragma: no-cache
...
16:42:52  Thread-22  Connection.run:    writeBytes(): writing to browser: HTTP/1.0 200 OK
16:42:53  Thread-22  Connection.run:    ***** reading and sending server body *****
16:42:53  Thread-22  Connection.run:    write(): writing to browser: 1849
16:42:53  Thread-22  Connection.run:    End task
16:43:39  Thread-1   New connection opened on port: 2478 Local port: 1080
16:43:39  Thread-1   Connection.constructor:
16:43:39  Thread-1   Connection.constructor:  new thread
```

Ess Mail Label No.
EI585425165US
52-3172

-45-

DEFAULT.HTML - WEB8 default start page

This page was displayed because the URL did not specify a specific document name. Like most WEB servers, the D a complete name for a document to be displayed. The files that are currently available are listed below.

| | |
|---|---|
| Big Message Test | Allows tester to generate messages with text box containing large amounts of dat |
| Form-based file upload | An example of a file upload using RFC 1867 Form-based file upload specificatic |
| Customer Information | An example of a customer information page. |
| ALT Customer Information | An example of a customer information page using alternate scripting model with ' JavaScript 'var' statements. |
| POST Data Entry Form | An example of a data entry form using METHOD="POST" |
| GET Data Entry Form | An example of a data entry form using METHOD="GET" |
| Logoff | Sets CONTEXT=0 |

Diagram 5: User selects *Logoff*

```
16:43:39  Thread-23  GET /PHFB.WEB8/24f2fb.d3518296df.3618E7D7/logoff/logoff.htm HTTP/1.0

16:43:39  Thread-23  Connection.run:  ***** reading and sending browser header *****
16:43:39  Thread-23  DSASession.write (string):  writing (106): logoff
CONTEXT=24f2fb.d3518296df GET /PHFB.WEB8/24f2fb.d3518296df.3618E7D7/logoff/logoff.htm HTTP/1.0
16:43:39  Thread-23  Connection.run:  *** reading and sending browser body ***
16:43:39  Thread-23  Connection.run:  ***** reading and sending server response *****
16:43:40  Thread-23  DSASession.byte[] readDSA():  line = HTTP/1.0 200 CONTEXT=0
Content-type: text/html <!DOCTYPE HTML PUBLIC "-//IETF//DTD HTML//EN">
<html>

<head>
<meta http-equiv="Content-Type"
content="text/html; charset=iso-8859-1">
<meta name="GENERATOR" content="Microsoft FrontPad 2.0">
<title>WEB8 Logged off</title>
<base href="http://sandpiper:1080/PHFB.WEB8/0/"></head>

<body bgcolor="#FFFFFF">

<h1>WEB8 Logged off </h1>
```

Express Mail Label No.
EI585425165US
52-3172
```
16:43:40  Thread-23  Connection.run:  ***** reading and sending server body *****
16:43:40  Thread-23  Connection.run:  : end of read = 0 contentLength = -735
16:43:40  Thread-23  NULLSession.close
16:43:40  Thread-23  Connection.run:  End task
```
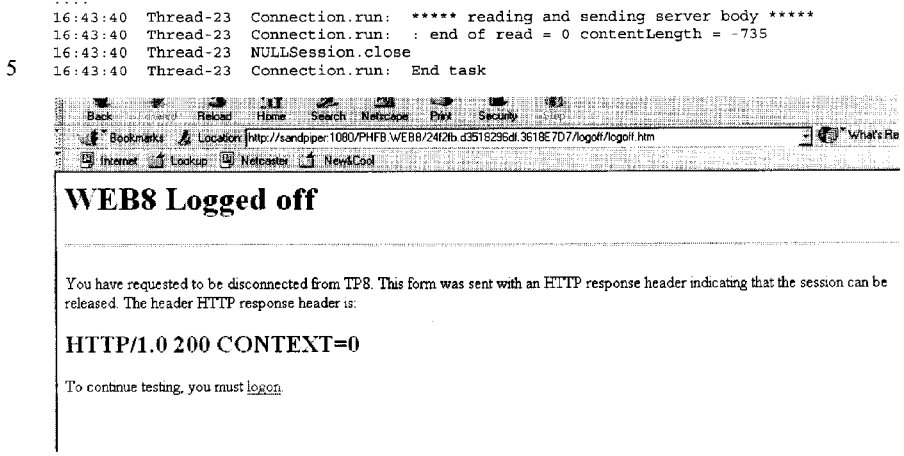
Diagram 6: User logged off Ess Mail Label No.
EI585425165US
52-3172

-47-

II. GTEA Component 10-5

GTEA component 10-5 is a communications layer that supports a set of APIs that allow a program to open and manipulate DSA sessions over TCP/IP using RFC1006.

The following are code examples in C and Java programming languages showing how to initiate a DSA session to server system 20 (e.g. Bull HN Information System's Web8 and timesharing systems), send a command, receive the output and disconnect the session.

A. Example in C Code using GTEA component 10-5 to communicate with server system 20 with DSA over TCP/IP.

```
#include <stdio.h>
#include <string.h>
#include "tcpd.h"
main(int argc, char **argv) {
    dsa_err e;
    conn_handle c;
    char *p, cmd[80];
    int len;

/* make sure we have a command */
    if (argc < 2) { printf("no command"); exit(1); }
    strcat( strcpy(cmd, argv[1]), "\r");

/* connect to TP8 */
    c = dsa_connect("xxxx", "yyyy", "web8", 0, NULL, NULL, &e);
    if (c <0) { printf("error connect"); exit(1); }

/* send a command and pass the turn */
    dsa_write(c, cmd, strlen(cmd), TRUE, &e);

/* receive output until we get the turn back */
    do {
        if ((p = dsa_read(c, &len, &e)) == NULL) break;
        p[len] = '\0';
        fputs(p, stdout);
    } while (!dsa_have_turn(c));

/* disconnect */
    dsa_close(c, 0);
    return 0;
}
```

E    ss Mail Label No.
EI585425165US
52-3172

-48-

B.  Example in Java Code using GTEA component 10-5 to communicate with timesharing system using a DSA session over TCP/IP.

```java
    import java.io.*;
 5  import java.util.*;
    import com.bull.tcpdsa.dsa_connection;
    import com.bull.tcpdsa.dsaException;

class gcos_connection {
10
    public static void main(String argv[])
    {
        String ipserver;
        String dsa_mailbox;
15      String dsa_node;
        int msg_len;
        byte [] in_msg;
        byte [] out_msg;
        String out_str = null;
20      boolean need_logon=false;
        boolean trace=false;
        boolean debug=false;
        String personid = "person";
        String proj_id = "project";
25      String billing = null;
        String pw = "xyz";
        DataInputStream din;
          dsa_connection conn;

30      int i;

if (argv.length < 2) {
            System.err.println("Usage: [-l -d -t] <server> <mbx> [<dsanode>]");
            System.exit(-1);
35      } for (i=0; i<=2; i++) {
            if (argv[i].startsWith("-"))
40              if(argv[i].compareTo("-l")== 0)
                   need_logon = true;
                else if (argv[i].compareTo("-d") == 0)
                   debug = true;
                else if (argv[i].compareTo("-t") == 0)
45                 trace = true;
                else {
                 System.err.println("Unknown flag "+argv[3]);
                 System.exit(-1);
                }
50          else
               break;
        } ipserver = argv[i];
55      dsa_mailbox = argv[i+1];
        if (argv.length > i+2)
```

E... ss Mail Label No.
EI585425165US
52-3172

-49-

```
            dsa_node = argv[i+2];
       else
            dsa_node = argv[i];

5      if (debug)
           for(i=0; i<argv.length; i++)
              System.out.println(">>>Arg "+i+" "+argv[i]);

conn = new dsa_connection(debug,trace);
10      din = new DataInputStream(System.in);

try {
           conn.dsa_connect(ipserver, dsa_node, dsa_mailbox, conn.VIP7200,
15                          personid, proj_id, billing, pw);

while(true) {
           while (!conn.dsa_have_turn()) {
              in_msg = conn.dsa_read();
20            if (in_msg == null) {
                 System.out.println("Session terminated");
                 System.exit(0);
              }
                    for (i=0; i<in_msg.length; i++)
25                     if (in_msg[i] != (byte) 0x7f)  // skip null bytes
                    System.out.write(in_msg[i]);
                       System.out.flush();
           }
           try {
30            out_str = din.readLine() + "\r";
              } catch (IOException e) {
                    System.out.println("Error reading input""
                                      + e .toString());
                    System.exit(-1);
35            }
           if (out_str.compareTo("$*$BRK\r") == 0)
              conn.dsa_send_attn();
           else {
              out_msg = new byte[out_str.length()];
40            out_str.getBytes(0,out_str.length(),out_msg,0);
              conn.dsa_write(out_msg);
           }
        }
        } catch (dsaException e) {
45            System.out.println(e.toString());
              System.exit(-1);
           }
    } //end of main()

50  }
```

E. ₃s Mail Label No.
EI585425165US
52-3172

-50-

III. API Library 20-6

The API Library 20-6 contains a number of runtime routines that are called by TPR transaction programs. One of these routines is designated as "HTML_BASE which is called for the purpose of generating a BASE value used in implementing persistent
5  session connections. For further information regarding other runtime routines referenced herein, reference may be made to the previously cited Bull User Manual.

A. Description of HTML_BASE Runtime Routine

This routine generates an HTML <BASE> element with application context in the form:
10
```
<BASE href="http://gateway:port/node.mbx/1234.5678.abcd/">.
```

Also, the routine returns the application-context field as a separate string, to be sent by the TPR in the HTTP response header.

1.0 Syntax in C
15
```
HTML_BASE(base, &cbBase, gwContext, &appContext, &err);
```

1.1 Syntax in COBOL-85
```
CALL "HTML_BASE" USING base, cbBase, gwContext, appContext, err.
```

20 1.3 Parameters

| | |
|---|---|
| base | Pointer to the character buffer to receive the generated <BASE> element string. On return, base contains a null-terminated string that is suitable for use by C library routines. |
| cbBase | Pointer to an integer (comp-6) that contains the maximum size of the buffer pointed to by base. On return, cbBase contains the actual size of the generated <BASE> element. COBOL-85 programs will use cbBase when processing the resulting base buffer. |
| gwContext | Pointer to a character buffer to receive the appContext converted to a hexadecimal string. The buffer must be eight bytes in length. |

E. ss Mail Label No.
EI585425165US
52-3172

-51-

| | |
|---|---|
| appContext | Pointer to an integer (comp-6) that contains the application-defined value to be included in the new <BASE> element. The value of appContext becomes the third field of the session-identifier portion of the base URL. |
| err | Pointer to an integer (comp-6) to receive a value that indicates whether the call was successful. A value of zero indicates a successful call. A negative value indicates that an error occurred. |

1.4  Notes

1. The HTML_BASE routine is used to generate an HTTP response message that sets a base URL for future requests from the browser component. In general, a Web application will provide a logon transaction that uses this routine to establish the base URL for each new connection to TP software. After the logon transaction has established the base URL, all HTML pages generated by the application can use relative URLs to submit transactions over the same session connection.

2. The generated base contains URL elements up to and including the session identifier.

```
   <BASE HREF="http://gateway:port/node.mbx/1234.5678.abcd/">
   ```

3. Relative links that reside on a Web page that contains the <BASE> element specify the next TP command and any optional information; for example:

```
   You are now logged on.
   The <A HREF="nxtcmd/custinfo.htm">Customer Information<A>
     form is now available.
   ```

When a user selects the Customer Information link in the above example, the browser appends the relative-link information that is provided in the <A> tag to the base URL to submit a request for the "nxtcmd" using the full URL as follows:

```
   http://gateway:port/node.mbx/1234.5678.abcd/nxtcmd/custinfo.htm
   ```

4. Error conditions are indicated by placing a negative value in err:

| | |
   |---|---|
   | ERR_HTML_BASE_SIZE | base too small to hold result |
   | ERR_HTML_BASE_CTXFMT | invalid context format in URL: The HTTP request submitted by the browser contains an invalid context string. |
   | ERR_HTTP_GETHDR_xxx | any errors returned by HTTP_GETHDR |

E... ss Mail Label No.
EI585425165US
52-3172

-52-

B. C Example

```
char  newbase[256];
int   cbBase = sizeof(newbase);
int   gwContext[8];
int   appContext = 1;
int   err;

HTML_BASE(newbase, &cbBase, gwContext, &appContext, &err);

printf("HTTP/1.0 200 CONTEXT=%8.8s\r\n"
    "Content-type: text/html\r\n"
    "Pragma: no-cache\r\n"
    "\r\n"
    "<html><HEAD>\r\n"
    "<TITLE>Web 8 Logon accepted<TITLE>\r\n"
    "%s\r\n"
    "</HEAD>\r\n"
    "<BODY><H1>Logon Accepted</H1><HR>\r\n"
    "You are now logged on. The "
    "<A HREF="nxtcmd/custinfo.htm">Customer Information</A>"
    " form is now available."
    "<BODY>\r\n"
    "</html>\r\n"
    gwContext, newbase
    );
```

C. COBOL-85 Example

```
data division.
77  gwContext   pic x(8).
77  appContext  comp-6 value 1.
77  err         comp-6.
77  msgPtr      comp-6.
77  msgText     pic x(1024).
77  NL          pic x(2) value ""14,11"".
77  cbBase      comp-6.
01  base.
    02  basedata pic x occurs 0 to 256 times depending on cbBase.

procedure division.
    move 256 to cbBase.
    call "HTML_BASE" using base, cbBase, gwContext, appContext, err.
    move 1 to msgPtr.
    string "HTTP/1.0 200 CONTEXT=" gwContext NL
        "Content-type: text/html" NL
        "Pragma: no-cache" NL
        NL
        "<html><HEAD>"
        "<TITLE>Web 8 Logon accepted</TITLE>" NL
        base
        "</HEAD>" NL
        "<BODY><H1>Logon Accepted</H1><HR>"
        NL "You are now logged on. The "
        "<A HREF=" "nxtcmd/custinfo.htm"">"
        "Customer Information</A>" NL
        " form is now available."
```

Express Mail Label No.
EI585425165US
52-3172

-53-

```
"</BODY>"
"</html>"
delimited size into msgText pointer msgPtr.
subtract 1 from msgPtr.
call "HTTP_SEND" using msgText, msgPtr.
```

While in accordance with the provisions and statutes there has been illustrated and described the best form of the invention, certain changes may be made without departing from the spirit of the invention as set forth in the appended claims and that in some cases, certain features of the invention may be used to advantage without a corresponding use of other features.

~~What is claimed is:~~

What is claimed is:

1. A method of efficiently processing requests from a client system to a number of remotely located server systems through a communications network, the method comprising the steps of:

(a) building a number of session pool table structures at client system startup for providing sets of session pools defining pre-established sets of persistent session connections;

(b) generating a request by a standard browser component included in the client system to be forwarded to the server system, the request containing an URL having a predetermined field coded to specify a session context value for indicating the type of session connection to be initiated through the communications network for transferring the request;

(c) maintaining a persistent connection table structure for storing session connection information for identifying and operating each persistent connection established by a transaction protocol gateway (TPG) component included in the client system located between the browser component and the communications network;

(d) operatively coupling the sets of session pool structures to the table structure for enabling management of all of the session connections by the persistent connection table structure;

(e) mapping the URL of each input connection request by the gateway component received from the browser component to a pre-stablished persistent session connection as specified by the session context value; and, (f) the gateway component transferring each request made by the browser component specifying use of persistent session pool connection for a session that contains the mapped URL to the server system over the communications network using the pre-established persistent session connection in lieu of having to create a new session connection and incur any associated overhead.

2. The method of claim 1 wherein the predetermined field is a session context field within each URL coded to specify a predetermined value for signaling when a session connection is to be established by the TPG component using an available pre-established session connection from one of the number of session pools.

3. The method of claim 2 wherein the predetermined value equals "1".

4. The method of claim of claim 2 wherein the predetermined field is an option field within each URL coded to specify a predetermined value for signaling when a session connection is to be established by the TPG component using an available pre-established session connections from one of the plurality of session pools.

5. The method of claim 1 wherein the step (a) of building a plurality of session table structures includes:

(1) creating a master session pool table structure having a number of entry locations for storing information for locating the session pool table structures;

(2) opening a configuration file containing a list of endpoint entries for which session connections are to be pre-established; and, (3) executing a setup routine for initializing each session pool table.

6. The method of claim 5 wherein the step (3) of executing a setup routine includes the steps of:

(i) generating an entry for locating each session pool table structure being initialized and loading each entry into a predetermined location of the master session pool table; and, (ii) creating an initial number of session connection entries for each session pool table being initialized and marking each created session connection entry as shared for enabling return of the session connection to the particular pool when that session connection is signaled to be closed.

7. The method of claim 6 wherein step (ii) further includes the step of obtaining values defining the initial and maximum values specifying the initial and maximum number of session connections for each session pool table being initialized.

8. The method of claim 6 wherein the initial and maximum values are supplied from either the configuration file or a command line.

9. The method of claim 1 wherein the method further includes the steps of:

(g) providing an administrative port connection between the browser component and gateway component for enabling configuration of session pool table structures as required for establishing and managing session pool connections.

10. The method of claim 5 wherein step (2) further includes the steps of:

(i) creating a session pool table structure for each endpoint entry in the list;

(ii) positioning an index entry in the master session pool location that can be located by a predetermined address value used for identifying the endpoint on the communications network.

11. The method of claim 10 wherein the predetermined address value corresponds to a host address field contained within the URL.

12. The method of claim 5 wherein the gateway component in response to a predetermined context value specifying use of a session pool connection for communicating with a particular remotely located server system performs the following steps:

(h) accessing the master session pool table for determining the presence of an entry within the master session pool table for locating a session pool table structure for that particular server system;

(i) accessing any present session pool table structure using the master session pool table entry for determining availability of a pre-established persistent session connection for the particular server system within the session pool table structure; and, (j) moving an entry of an available pre-established persistent session connection to the persistent session table for enabling opening of the pre-established session connection for communicating with the particular server system in lieu of having to establish a new session connection.

13. The method of claim 12 wherein step (h) further includes the steps of:

(1) creating a session pool table structure in the absence of an entry in the master session pool table for the particular server system and add an entry to the master session pool table for locating the generated session pool table structure;

(2) determining if the number of session pool table entries generated exceeds a pre-established maximum value for the generated session pool table;

(3) when the pre-established maximum value is not exceeded, opening an available pre-established session connection and placing an entry in the session pool table structure for locating that pre-established open connection; and, (4) marking the session pool table entry as shared for enabling return of the persistent session connection to the pool upon receipt of a signal indicating that the session connection is to be closed.

14. The method of claim 13 wherein step (i) further includes the steps of:
(1) when the pre-established maximum value is not exceeded, opening an available pre-established session connection and placing an entry in the session pool table structure for locating that pre-established open connection; and,
(4) marking the session pool table entry as shared for enabling return of the persistent session connection to the pool upon receipt of a signal indicating that the session connection is to be closed.

15. The method of claim 12 wherein the gateway component in the absence of the context value being not equal to the predetermined value performs normal open processing as a function of the context value.

16. The method of claim 5 further including the steps of:
(k) the browser component generating a close session request containing a URL coded for closing the persistent session connection for transmission to the server system;
(l) in response to the close session request, the gateway component accesses the persistent table structure and determines if the entry is marked shared;
(m) if shared, the gateway component determines if the number of entries in the session pool table exceeds a pre-established maximum value; and,
(n) if the maximum value is not exceeded, the gateway component moves the entry to the end of the session pool table structure making the pre-established persistent session connection available.

17. The method of claim 16 wherein if the maximum value is not exceeded, the gateway component performs normal close processing wherein the persistent session table entry containing persistent connection information for the connection identified by the URL is removed thereby making the location available for establishing other persistent session connections.

18. A client system for efficiently processing requests from the client system to a number of remotely located server systems through a communications network, the client system comprising:
(a) a standard browser component for generating a request to be forwarded to the server system, the request containing an URL having a predetermined field coded to specify a session context value for indicating the type of session connection to be initiated through the communications network for transferring the request;
(b) a gateway component located between the browser component and the communications network, the gateway component for managing and establishing persistent session connections in response to browser requests, the gateway component comprising:
(1) a number of session pool table structures built at client system startup for providing sets of session pools defining pre-established sets of persistent session connections;
(2) a persistent session table structure for storing session connection information for identifying each established persistent connection, the persistent session table structure being operatively coupled to the number of session pool table structures for enabling management of all of the session connections by the persistent session table structure;
(3) a component for mapping the URL of each input connection request by the gateway component to a pre-established persistent session connection using the session pool table structures according to the session context value; and,
(4) a component for causing the transfer each request made by the browser component specifying use of a persistent session pool connection for a session that contains the mapped URL to the specified server system over the communications network using the pre-established persistent session connection from a session pool table structure created for the specified server system in lieu of having to create a new session connection and incur any associated overhead.

19. The client system of claim 18 wherein the predetermined field is a session context field coded to specify a predetermined value for designating when a session connection is to be established by the gateway component using an available pre-established session connection from one of the number of session pools.

20. The system of claim 18 wherein the predetermined field is an option field within each URL coded to specify a predetermined value for signaling when a session connection is to be established by the TPG component using an available pre-established session connections from one of the plurality of session pools.

21. The client system of claim 18 wherein the gateway component further includes a building mechanism for generating the number of session table structures at client system startup, the mechanism being operative to: (1) create a master session pool table structure having a number of entry locations for storing information for locating the session pool table structures; (2) open a configuration file containing a list of endpoint entries for which session connections are to be pre-established; and, (3) execute a setup routine for initializing each session pool table.

22. The client system of claim 21 wherein the execution of the setup routine:
(1) generates an entry for locating each session pool table structure being initialized and loads each entry into a predetermined location of the master session pool table; and,
(2) creates an initial number of session connection entries for each session pool table being initialized and marks each created session connection entry as shared for enabling return of the session connection to the particular pool when that session connection is signaled to be closed.

23. The client system of claim 22 wherein during initialization of each session pool table, the gateway component obtains values defining the initial and maximum values specifying the initial and maximum number of session connections for each session pool table being initialized.

24. The client system of claim 22 wherein the initial and maximum values are supplied from either the configuration file or a command line.

25. The client system of claim 18 wherein the client system further includes:
an administrative port connection between the browser component and gateway component for enabling configuration of session pool table structures as required for establishing and managing session pool connections.

26. The client system of claim 21 wherein the building mechanism operates to:
(1) create a session pool table structure for each endpoint entry in the list; and, (2) position an index entry in the master session pool location that can be located by a predetermined address value used for identifying the server system endpoint on the communications network.

27. The client system of claim 26 wherein the predetermined address value corresponds to a host address field contained within the URL.

28. The client system of claim 21 wherein the gateway component in response to a predetermined context value specifying use of a session pool connection for communicating with a particular remotely located server is operative to:

(1) access the master session pool table for determining the presence of an entry within the master session pool table for locating a session pool table structure for that particular server system;

(i) access any present session pool table structure using the master session pool table entry for determining availability of a pre-established persistent session connection for the particular server system within the session pool table structure; and, (j) move an entry of an available pre-established persistent session connection to the persistent session table for enabling opening of the pre-established session connection for communicating with the particular server system in lieu of having to establish a new session connection.

29. The client system of claim 28 wherein the gateway component further is operative to:

(1) create a session pool table structure in the absence of an entry in the master session pool table for the particular server system and add an entry to the master session pool table for locating the generated session pool table structure;

(2) determine if the number of session pool table entries generated exceeds a pre-established maximum value for the generated session pool table;

(3) when the pre-established maximum value is not exceeded, open an available pre-established session connection and place an entry in the session pool table structure for locating that pre-established open connection; and, (4) mark the session pool table entry as shared for enabling return of the persistent session connection to the pool upon receipt of a signal indicating that the session connection is to be closed.

30. The client system of claim 29 wherein when the pre-established maximum value is not exceeded, the gateway component is further operative to (1) open an available pre-established session connection and placing an entry in the session pool table structure for locating that pre-established open connection; and (2) mark the session pool table entry as shared for enabling return of the persistent session connection to the pool upon receipt of a signal indicating that the session connection is to be closed.

31. The client system of claim 28 wherein the gateway component in the absence of the context value being not equal to the predetermined value performs normal open processing as a function of the URL context value.

32. The system of claim 18 wherein the browser component generates a close session request containing a URL coded for closing the persistent session connection for transmission to one of the server systems and in response to the close session request, the gateway component accesses the persistent table structure and determines if the entry is marked shared, if shared, the gateway component determines if the number of entries in the session pool table exceeds a pre-established maximum value and if the maximum value is not exceeded, the gateway component moves the entry to the end of the session pool table structure making the pre-established persistent session connection available.

33. The system of claim 32 wherein if the maximum value is not exceeded, the gateway component performs normal close processing wherein the persistent session table entry containing persistent connection information for the connection identified by the URL is removed making the location available for establishing other persistent connections.

34. A program product for efficiently processing requests from a client system to a number of remotely located server systems through a communications network, the program product comprising:

a gateway program component program containing instructions for:

generating a request by a standard browser component included in the client system to be forwarded to the server system, the request containing an URL having a predetermined field coded to specify a session context value for indicating the type of session connection to be initiated through the communications network for transferring the request;

building a number of session pool table structures at client system startup for providing sets of session pools defining pre-established sets of persistent session connections;

maintaining a persistent session table structure for storing session connection information for identifying each persistent connection established by the gateway component operating between the browser component and the communications network and for managing all of the session connections established using the session pool structures;

mapping the URL of each input connection request received from the browser component to a pre-established persistent session connection as specified by the session context value; and, transferring each request made by the browser component during a session that contains the mapped URL specifying use of a session pool to the URL specified server system over the communications network using the pre-established persistent session connection in lieu of having to create a new session and incur any associated overhead.

* * * * *